(12) United States Patent
Kim et al.

(10) Patent No.: US 12,532,335 B2
(45) Date of Patent: Jan. 20, 2026

(54) BEAM-BASED SIDELINK COMMUNICATION METHOD AND APPARATUS

(71) Applicant: ELECTRONICS AND TELECOMMUNICATIONS RESEARCH INSTITUTE, Daejeon (KR)

(72) Inventors: Jun Hyeong Kim, Daejeon (KR); Go San Noh, Daejeon (KR); Seon Ae Kim, Daejeon (KR); Il Gyu Kim, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 400 days.

(21) Appl. No.: 18/117,757

(22) Filed: Mar. 6, 2023

(65) Prior Publication Data

US 2023/0292348 A1 Sep. 14, 2023

(30) Foreign Application Priority Data

Mar. 8, 2022 (KR) .................. 10-2022-0029503
Mar. 3, 2023 (KR) .................. 10-2023-0028594

(51) Int. Cl.
*H04W 72/40* (2023.01)
*H04W 72/02* (2009.01)
*H04W 72/044* (2023.01)

(52) U.S. Cl.
CPC .......... *H04W 72/40* (2023.01); *H04W 72/02* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 10,873,866 B2 | 12/2020 | Kim | |
| 11,050,543 B1 | 6/2021 | Balasubramanian et al. | |
| 11,197,282 B2 | 12/2021 | Kim et al. | |
| 12,407,433 B2 * | 9/2025 | Chae | H04L 5/0044 |
| 2020/0036422 A1 | 1/2020 | Li et al. | |
| 2020/0221423 A1 | 7/2020 | Wang et al. | |

(Continued)

FOREIGN PATENT DOCUMENTS

EP    3910806 A1    11/2021

*Primary Examiner* — Phirin Sam
(74) *Attorney, Agent, or Firm* — LRK PATENT LAW FIRM

(57) ABSTRACT

A method of a transmitting terminal may include: setting an initial beam pairing flag indicating that the transmitting terminal transmitting sidelink-synchronization signal blocks (S-SSBs) is not a synchronization reference terminal; transmitting a plurality of S-SSBs including the initial beam pairing flag in a beam sweeping scheme; receiving, from a receiving terminal, information on a preferred beam among a plurality of beams through which the plurality of S-SSBs are transmitted; and transmitting data to the receiving terminal using the preferred beam.

17 Claims, 16 Drawing Sheets

(56) References Cited

U.S. PATENT DOCUMENTS

| | | | |
|---|---|---|---|
| 2020/0359366 A1 | 11/2020 | Kim et al. | |
| 2020/0413374 A1 | 12/2020 | Luo et al. | |
| 2021/0159963 A1 | 5/2021 | Akkarakaran et al. | |
| 2021/0160850 A1 | 5/2021 | Akkarakaran et al. | |
| 2021/0194558 A1 | 6/2021 | Venugopal et al. | |
| 2022/0053538 A1* | 2/2022 | Akkarakaran | H04B 7/063 |
| 2022/0094499 A1* | 3/2022 | Wang | H04W 76/14 |
| 2022/0231898 A1* | 7/2022 | Li | H04W 56/001 |
| 2022/0286179 A1* | 9/2022 | Hosseini | H04W 72/20 |
| 2022/0338202 A1* | 10/2022 | Kim | H04B 7/06 |
| 2022/0393735 A1* | 12/2022 | Xue | H04B 7/0695 |
| 2023/0086126 A1* | 3/2023 | Nam | H04W 72/20 |
| | | | 370/329 |
| 2023/0114450 A1* | 4/2023 | Xue | H04L 5/0091 |
| | | | 370/329 |
| 2023/0199819 A1* | 6/2023 | Fouad | H04W 72/0446 |
| | | | 370/329 |
| 2023/0232401 A1* | 7/2023 | Wang | H04W 92/18 |
| | | | 370/329 |
| 2023/0387973 A1* | 11/2023 | Xue | H04B 7/0695 |
| 2024/0224237 A1* | 7/2024 | Ganesan | H04W 72/563 |
| 2025/0119260 A1* | 4/2025 | Cirik | H04L 5/0055 |

\* cited by examiner

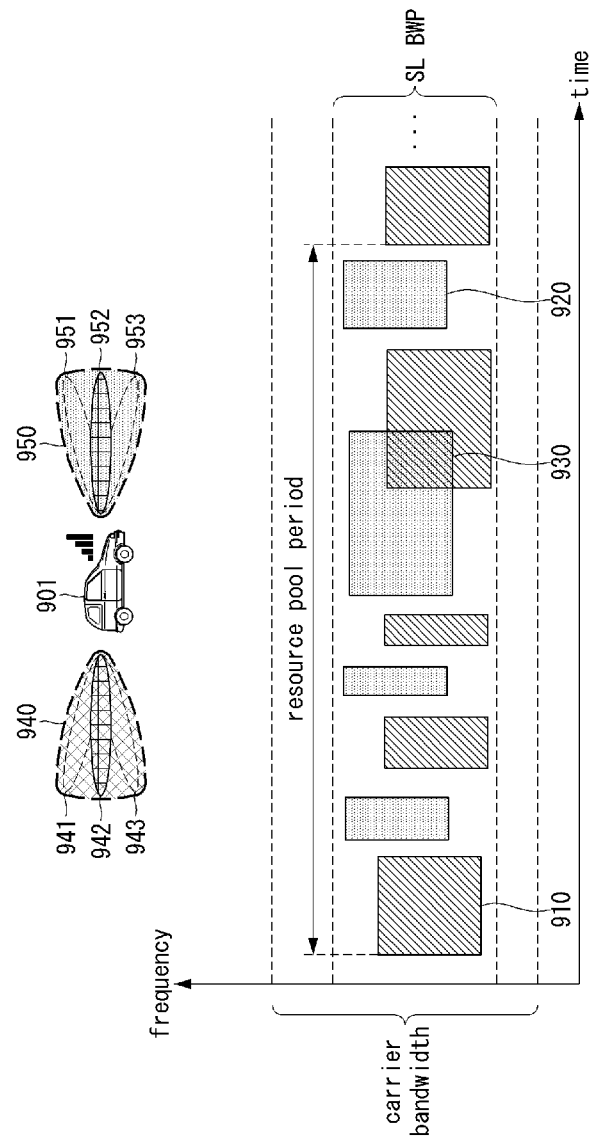

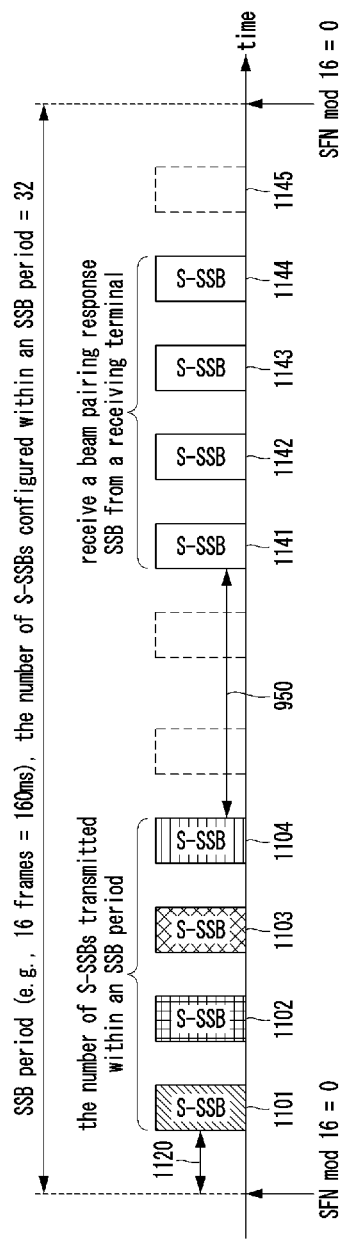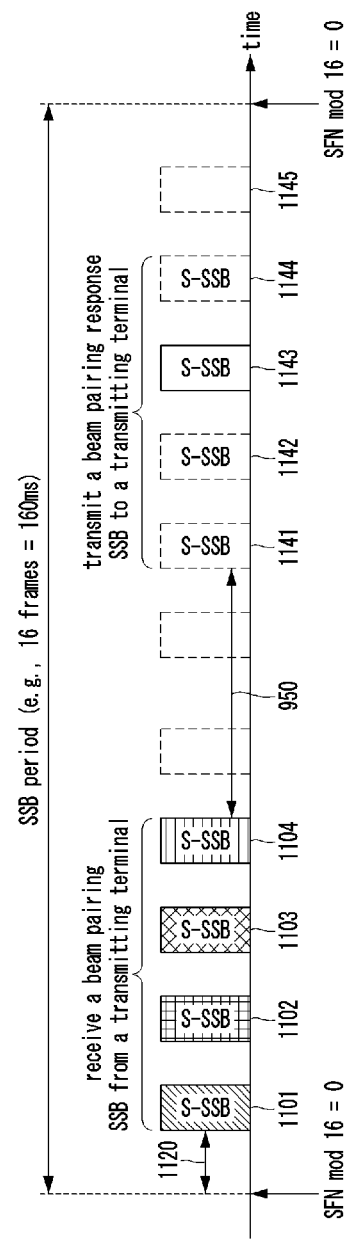

BEAM-BASED SIDELINK COMMUNICATION METHOD AND APPARATUS

CROSS-REFERENCE TO RELATED APPLICATIONS

This application claims priority to Korean Patent Applications No. 10-2022-0029503, filed on Mar. 8, 2022, and No. 10-2023-0028594, filed on Mar. 3, 2023, with the Korean Intellectual Property Office (KIPO), the entire contents of which are hereby incorporated by reference.

BACKGROUND

1. Technical Field

Exemplary embodiments of the present disclosure relate to a sidelink (SL) communication technique, and more particularly, to a beam-based sidelink communication technique.

2. Description of Related Art

The Vehicle-to-Everything (V2X) communication technology is a communication technology for exchanging various information including traffic information with other vehicles and other infrastructures such as roads through wired/wireless networks. The V2X communication of the prior arts includes communication between vehicles (i.e., Vehicle-to-Vehicle (V2)), between vehicle and road infrastructure/network (i.e., Vehicle-to-Infrastructure/Network (V2I/N)), between vehicle and pedestrian (i.e., Vehicle-to-Pedestrian (V2P)), and/or the like. As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

Meanwhile, the 5G New Radio (NR) standard makes it possible to reliably provide high-speed data using a beamforming technique while transmitting signals in a higher frequency band. Therefore, even in sidelink communication, a beamforming-based resource allocation and communication method is required.

SUMMARY

Exemplary embodiments of the present disclosure provide a method and an apparatus for beam-based sidelink communication.

A method of a transmitting terminal, according to a first exemplary embodiment of the present disclosure, may comprise: setting an initial beam pairing flag indicating that the transmitting terminal transmitting sidelink-synchronization signal blocks (S-SSBs) is not a synchronization reference terminal; transmitting a plurality of S-SSBs including the initial beam pairing flag in a beam sweeping scheme; receiving, from a receiving terminal, information on a preferred beam among a plurality of beams through which the plurality of S-SSBs are transmitted; and transmitting data to the receiving terminal using the preferred beam.

The method may further comprise: dividing available beams of the transmitting terminal into a plurality of beam groups; and selecting one group from among the plurality of groups, wherein the plurality of beams used for transmission of the plurality of S-SSBs are included in the one group.

The initial beam pairing flag may be included in a physical sidelink broadcast channel (PSBCH) of each of the plurality of S-SSBs, and 1 bit among reserved bits included in a payload of the PSBCH may be used to indicate the initial beam pairing flag.

The plurality of S-SSBs may be transmitted within a transmission period, and the transmission period and a number of the plurality of S-SSBs transmitted within the transmission period may be configured by higher-layer signaling of the transmitting terminal.

The information on the preferred beam may be included in a response S-SSB transmitted by the receiving terminal, and the response S-SSB may include the initial beam pairing flag.

The response S-SSB may be received in a transmission resource associated with a transmission resource of a first S-SSB having the preferred beam among the plurality of S-SSBs.

The information on the preferred beam may be received on an earliest physical sidelink feedback channel (PSFCH) after a feedback offset from a transmission time of a last S-SSB among the plurality of S-SSBs.

The method may further comprise: transmitting, to the receiving terminal, configuration information of a channel state information-reference signal (CSI-RS) for each of the plurality of beams; and transmitting, to the receiving terminal, sidelink control information (SCI) including information requesting a CSI report.

A method of a receiving terminal, according to a second exemplary embodiment of the present disclosure, may comprise: receiving, from a transmitting terminal, a plurality of sidelink synchronization signal blocks (S-SSBs); identifying an initial beam pairing flag included in each of the plurality of S-SSBs; selecting one S-SSB from among the plurality of S-SSBs; determining a beam corresponding to the one S-SSB as a preferred beam; and transmitting, to the transmitting termina, information on the preferred beam, wherein the initial beam pairing flag indicates that the transmitting terminal transmitting the plurality of S-SSBs is not a synchronization reference terminal.

The initial beam pairing flag may be included in a physical sidelink block channel (PSBCH) of each of the plurality of S-SSBs, and 1 bit among reserved bits included in a payload of the PSBCH may be used to indicate the initial beam pairing flag.

The plurality of S-SSBs may be transmitted within a transmission period, and the transmission period and a number of the plurality of S-SSBs transmitted within the transmission period may be configured by higher-layer signaling of the transmitting terminal.

The information on the preferred beam may be included in a response S-SSB transmitted by the receiving terminal, and the response S-SSB may include the initial beam pairing flag.

The response S-SSB may be transmitted in a transmission resource associated with a transmission resource of a first S-SSB having the preferred beam among the plurality of S-SSBs.

The information on the preferred beam may be transmitted on an earliest physical sidelink feedback channel (PSFCH) after a feedback offset from a reception time of a last S-SSB among the plurality of S-SSBs.

A transmitting terminal, according to a third exemplary embodiment of the present disclosure, may comprise a processor, wherein the processor may cause the transmitting terminal to perform: setting an initial beam pairing flag indicating that the transmitting terminal transmitting sidelink-synchronization signal blocks (S-SSBs) is not a synchronization reference terminal; transmitting a plurality of S-SSBs including the initial beam pairing flag in a beam sweeping scheme; receiving, from a receiving terminal, information on a preferred beam among a plurality of beams through which the plurality of S-SSBs are transmitted; and transmitting data to the receiving terminal using the preferred beam.

The processor may further cause the transmitting terminal to perform: dividing available beams of the transmitting terminal into a plurality of beam groups; and selecting one group from among the plurality of groups, wherein the plurality of beams used for transmission of the plurality of S-SSBs are included in the one group.

The initial beam pairing flag may be included in a physical sidelink broadcast channel (PSBCH) of each of the plurality of S-SSBs, and 1 bit among reserved bits included in a payload of the PSBCH may be used to indicate the initial beam pairing flag.

The plurality of S-SSBs may be transmitted within a transmission period, and the transmission period and a number of the plurality of S-SSBs transmitted within the transmission period may be configured by higher-layer signaling of the transmitting terminal.

The information on the preferred beam may be included in a response S-SSB transmitted by the receiving terminal, the response S-SSB may include the initial beam pairing flag, and the response S-SSB may be received in a transmission resource associated with a transmission resource of a first S-SSB having the preferred beam among the plurality of S-SSBs.

The information on the preferred beam may be received on an earliest physical sidelink feedback channel (PSFCH) after a feedback offset from a transmission time of a last S-SSB among the plurality of S-SSBs.

According to an exemplary embodiment of the present disclosure, during initial communication between a transmitting terminal and a receiving terminal in SL unicast communication, communication can be performed using an optimal beam or a preferred beam. It also has the advantage of being able to perform beam management while performing communication. In addition, a beam sensing operation can be performed based on a beam preference.

BRIEF DESCRIPTION OF DRAWINGS

FIG. 9A is a conceptual diagram for describing a case of allocating resources for each beam group from a resource pool of a vehicle terminal (hereinafter referred to as 'terminal') performing SL communication.

FIG. 11A is a timing diagram for describing an SSB-based unicast initial beam pairing procedure according to the second solution of the present disclosure.

FIG. 11B is another timing diagram for describing an SSB-based unicast initial beam pairing procedure according to the second solution of the present disclosure.

DETAILED DESCRIPTION OF THE EMBODIMENTS

Figure 1:
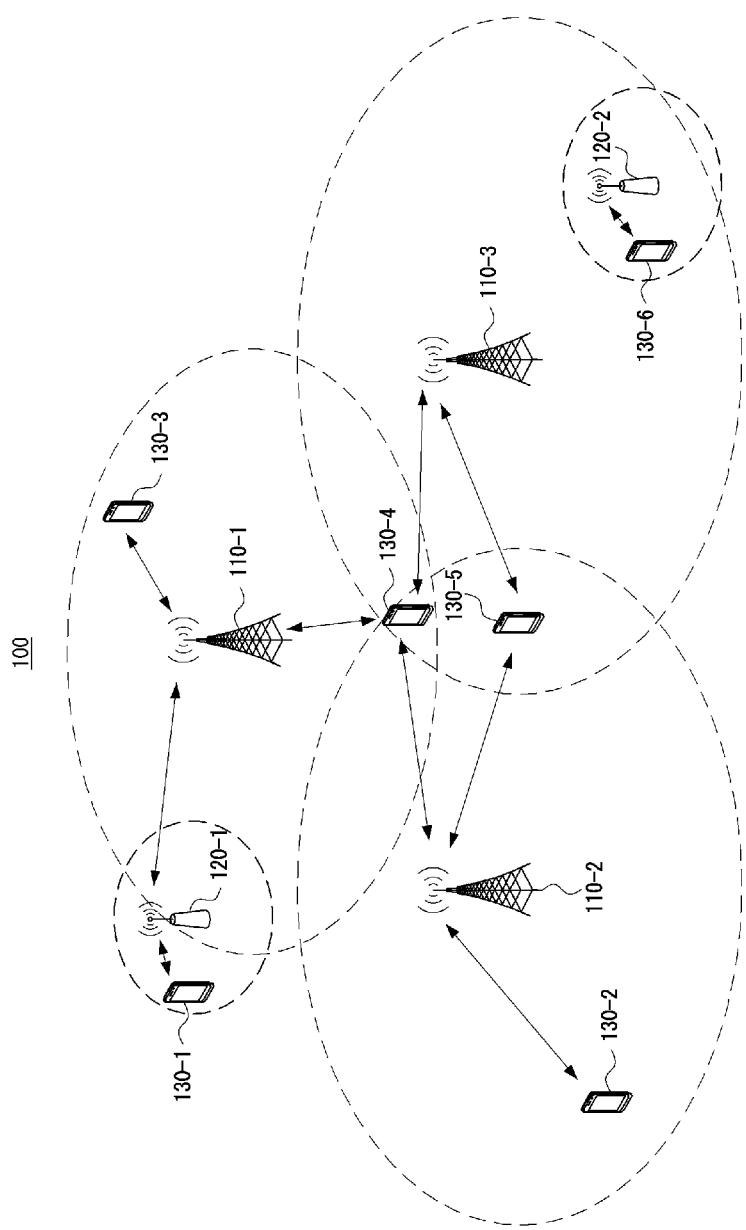
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
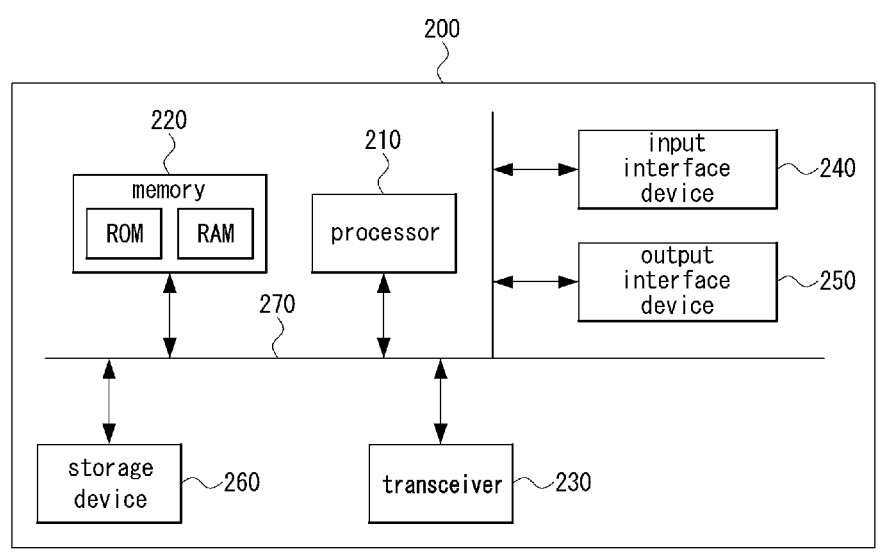
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for sidelink communication will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Hereinafter, sidelink communication will be described. The Vehicle-to-Everything (V2X) communication technology is a communication technology for exchanging various information including traffic information with other vehicles and other infrastructures such as roads through wired/wireless networks. The V2X communication of the prior arts includes communication between vehicles (i.e., Vehicle-to-Vehicle (V2)), between vehicle and road infrastructure/network (i.e., Vehicle-to-Infrastructure/Network (V2I/N)), between vehicle and pedestrian (i.e., Vehicle-to-Pedestrian (V2P)), and/or the like. As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

In various wireless communication systems including the 3GPP 4G Long Term Evolution (LTE) system, 'device-to-device (D2D)' communication scheme has been adopted to support various wireless communication services such as the V2X service. In the D2D communications scheme, terminals directly communicate with each other without going through network node(s). In the case of 3GPP, a direct communication link between terminals is defined as a sidelink. In the case of LTE, communication between terminals through a sidelink is possible even when out of network coverage, and the LTE sidelink has been first standardized for D2D communication in LTE release-12. Thereafter, there have been many standardization efforts in the 3GPP to improve the sidelink to be suitable for V2X communication.

In June 2018, the 3GPP has completed the 5G New Radio (NR) release-15 specifications, and started standardizing NR V2X, 3GPP V2X phase 3, from the RAN1#94 meeting in August 2018. In addition to the existing LTE-based V2X services, the NR V2X is directed to supporting improved V2X services and supplementing the LTE V2X services rather than replacing the services provided by the LTE V2X by interworking with the LTE V2X. In this reason, the NR V2X should satisfy higher requirements than those of the LTE V2X.

Currently, the NR V2X standardization is in progress, focusing primarily on sidelink design. As described above, a sidelink is a communication link through which data packets can be directly exchanged between terminals without going through a network.

Figure 3A:
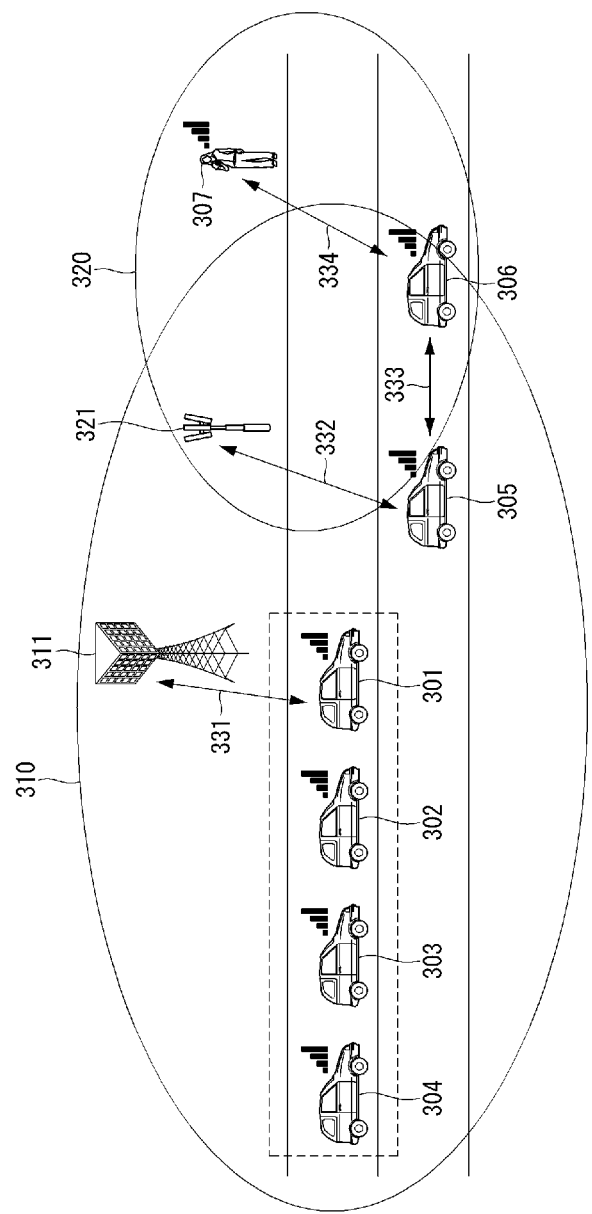
FIG. 3A is a conceptual diagram for describing types of sidelink communication according to the present disclosure.

FIG. 3A is a conceptual diagram for describing types of sidelink communication according to the present disclosure.

Referring to FIG. 3A, a base station (BS) 311 may have a base station communication coverage 310. A plurality of vehicle terminals 301, 302, 303, 304, 305, and 306 may be located within the base station communication coverage 310. In addition, a roadside unit (RSU) 321 may have a roadside unit communication coverage 320 based on a sidelink communication scheme. In addition, a plurality of terminals 305, 306, and 307 may be located within the roadside unit communication coverage 320. In FIG. 3A, a user having the terminal 307 capable of sidelink communication with the vehicle terminals 301, 302, 303, 304, 305, and 306 driving on a road is exemplified. The vehicle terminal may be a terminal mounted in a vehicle (or attached to the vehicle, or carried or worn by a driver or passenger of the vehicle). These vehicle terminals 301 to 306 will be referred to as vehicles for convenience of description. In addition, a pedestrian carrying (or wearing) the terminal 307 capable of sidelink communication will be referred to as a pedestrian or a user for convenience of description. In addition, since FIG. 3A is a diagram for describing sidelink communication according to the present disclosure, only parts related to the sidelink communication will be described. Then, various sidelink communications will be described below.

Sidelink communication between the base station 311 and the vehicle 301 is referred to as vehicle-to-network (V2N) communication 331. The V2N communication 331 may consist of a downlink (DL) from the base station 311 to the vehicle 301 and an uplink (UL) from the vehicle 301 to the base station 311.

Sidelink communication between the roadside unit 321 and the vehicle 305 is referred to as Vehicle-to-Infrastructure (V2I) communication 332. The V2I communication 332 may consist of a downlink (DL), an uplink (UL) and/or a sidelink (SL).

Sidelink communication between the vehicle 305 and the vehicle 306 is referred to as Vehicle-to-Vehicle (V2V) communication 333. The V2V communication 333 is a scheme of performing direct communication between the vehicles, and various data can be transmitted/received between the vehicles without control of a base station or roadside unit.

Further, sidelink communication between the vehicle 306 and the pedestrian 307 is referred to as Vehicle-to-Pedestrian (V2P) communication 334. The communication between the vehicle 306 and the pedestrian 307 may refer to communication between a high-speed moving object and a walking low-speed moving object. In addition, the V2P communication 334 may include communication between pedestrians or communication between users riding low-speed vehicles such as vehicles and bicycles.

Figure 3B:
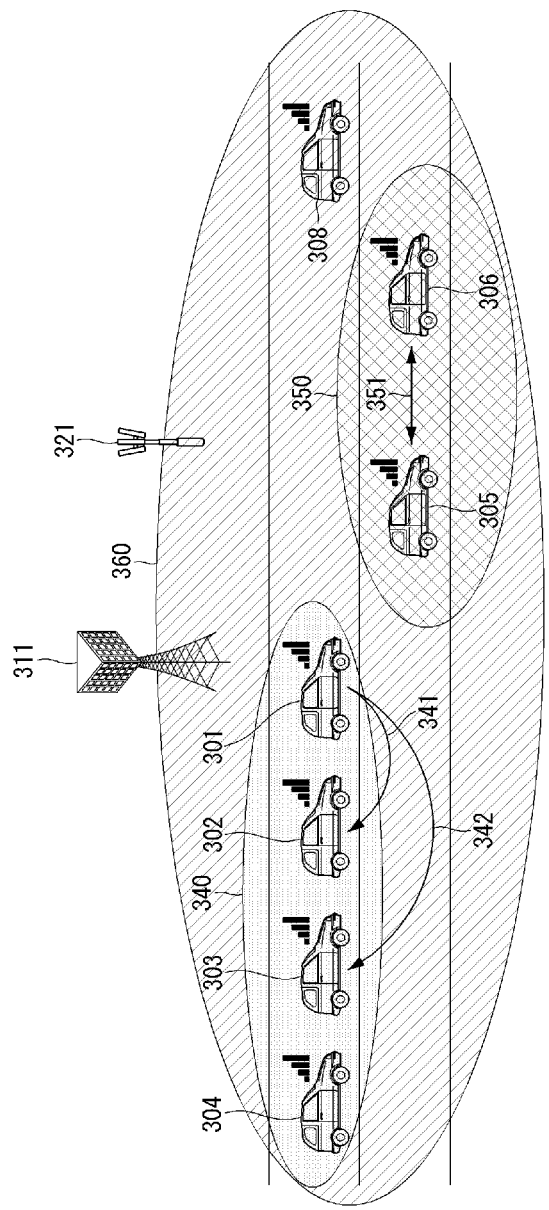
FIG. 3B is a conceptual diagram for describing broadcast, groupcast, and unicast-based sidelink communication provided by the NR V2X.

FIG. 3B is a conceptual diagram for describing broadcast, groupcast, and unicast-based sidelink communication provided by the NR V2X.

In contrast to FIG. 3A, in FIG. 3B, a new vehicle 308 is illustrated instead of the user 307, the communication coverage of the base station 311 is not illustrated, and the communication coverage of the roadside unit 321 is not illustrated. Except for the above, all other parts are the same.

A broadcast region 360 for broadcast-based sidelink communication mainly provided by the LTE V2X may be a region in which a beacon frame is transmitted by a specific communication device. In addition, the NR V2X has introduced unicast and groupcast-based sidelink communication to support more diverse V2X services in addition to the broadcast-based sidelink communication.

FIG. 3B illustrates one groupcast communication region 340 of a group to which the vehicles 301, 302, 303, and 304 belong, and a unicast communication region 350 for unicast communication between the vehicle terminals 305 and 306.

A case in which the vehicle 301 transmits data to other vehicles 302 and 303 within the groupcast communication region 340 based on groupcast is illustrated (341, 342). In particular, the form illustrated in FIG. 3B may be a form of vehicle platooning. In the case of vehicle platooning, the lead vehicle 301 may transmit sidelink messages to the other vehicles 302 and 303 in the group of vehicles moving together to adjust distances between the vehicles. FIG. 3B illustrates a case where the vehicle 301, which is a terminal within the group, transmits data to the vehicles 302 and 303 within the groupcast communication region 340, but a terminal outside the group may also transmit messages to the vehicles 301 to 304 within the group through groupcast communication.

In addition, in the case of unicast communication, the vehicles 305 and 306 may exist within a unicast communication region 350 and may communicate with each other. Therefore, in the NR V2X system, the vehicles 305 and 306 may transmit/receive messages directly therebetween through unicast communication.

Meanwhile, the NR V2X supports a resource allocation mode 2, which is a scheme of communicating only through sidelinks without control of the base station. In supporting the resource allocation mode 2, the most core technologies are resource sensing and resource selection methods for sidelink resources allocated to the terminal. Hereinafter, resource sensing and resource selection will be described with reference to FIG. 4.

Figure 4:
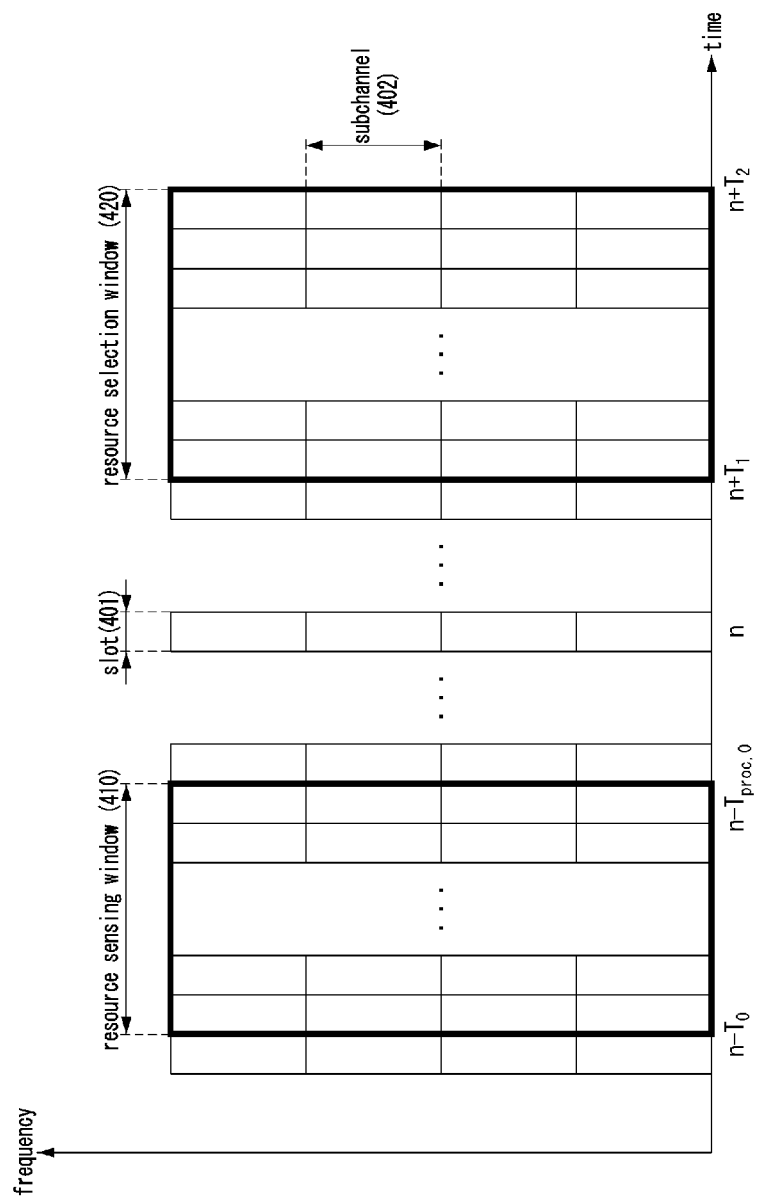
FIG. 4 is an exemplary diagram for describing a resource sensing window and a resource selection window configured in a terminal operating in the resource allocation mode 2 of NR V2X.

FIG. 4 is an exemplary diagram for describing a resource sensing window and a resource selection window configured in a terminal operating in the resource allocation mode 2 of NR V2X.

A sidelink resource pool in which transmission and reception is performed may be composed of slot(s) (e.g., 401) in the time domain and subchannel(s) (e.g., 402) in the frequency domain. FIG. 4 illustrates an example in which a terminal operating in the resource allocation mode 2 receives a resource selection trigger in a slot n. When a resource selection operation is triggered in the slot n, the terminal may sense resources in slots of a time period corresponding to a resource sensing window 410. In FIG. 4, a time period of $[n-T_0, n-T_{proc\_0}]$ is exemplified as an example of the time period sensed according to the resource sensing window 410. The terminal may select a resource for transmission within a time period corresponding to a resource selection window 420 based on the result of sensing the resources in the resource sensing window 410. In FIG. 4, a time period of $[n+T_1, n+T_2]$ is exemplified as an example of the time period of the resource selection window 420.

Figure 5:
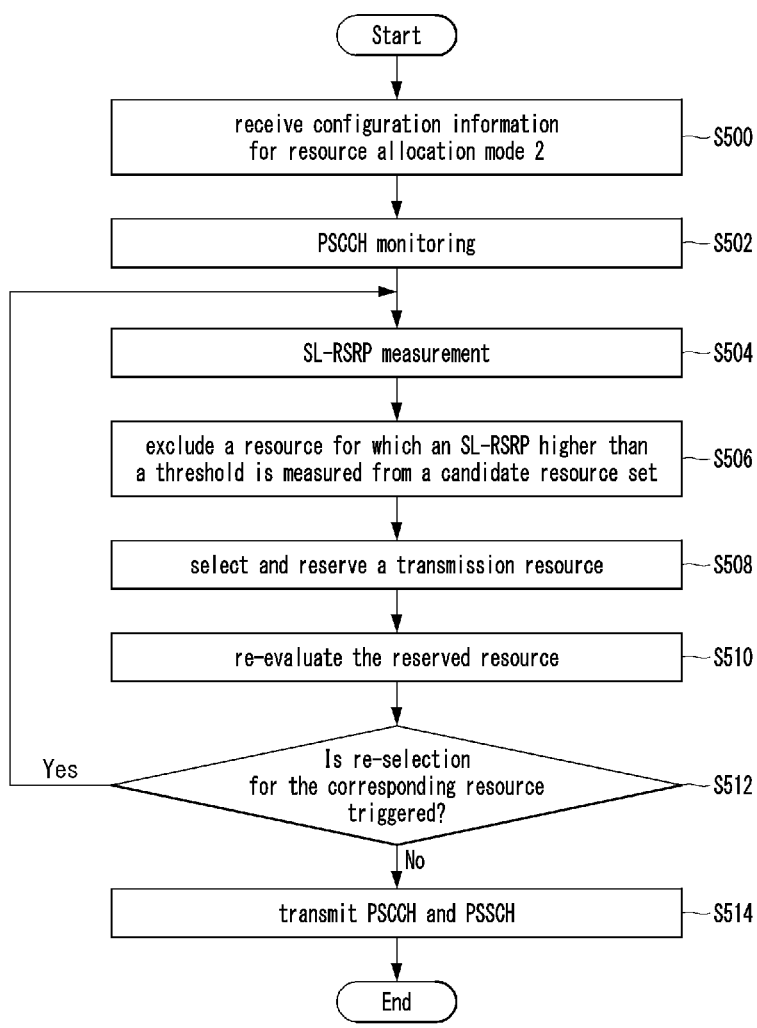
FIG. 5 is a flowchart for sidelink communication in a terminal operating in the sidelink resource allocation mode 2.

FIG. 5 is a flowchart for sidelink communication in a terminal operating in the sidelink resource allocation mode 2.

Referring to FIG. 5, the terminal may receive various configuration information for the resource allocation mode 2 from a higher layer (S500). The configuration information may include various parameters required for resource selection and resource sensing, such as resource pool configuration information, priority information, data packet delay budget (PDB) information, resource reservation interval information, candidate resource set information, resource selection window size information, resource sensing window size information, reference signal received power (RSRP) threshold information, and/or the like.

The terminal may continuously perform monitoring on a physical sidelink control channel (PSCCH) corresponding to a sidelink control channel (S502).

The terminal may measure RSRPs of a demodulation reference signal (DMRS) of the PSCCH detected from the monitoring and a DMRS of a physical sidelink shared channel (PSSCH), which is a sidelink data channel scheduled by the PSCCH (S504).

The terminal may exclude a resource for which an RSRP higher than the threshold received through the configuration information is measured from a preconfigured candidate resource set (S506).

The terminal may select and reserve a resource to be used for transmission from among remaining resources in the candidate resource set except for the excluded resource(s) (S508).

The terminal may re-evaluate the reserved resource (S510).

The terminal may determine whether re-selection for the resource is triggered (S512). As a result of the determination in step S512, if re-selection of the resource to be used for transmission is triggered, the terminal may perform the procedure again from step S504. On the other hand, if it is determined in step S512 that re-selection of the resource to be used for transmission is not triggered, the terminal may transmit a PSCCH and a PSSCH using the resource as it is (S514).

Meanwhile, when the resource selection procedure is triggered in the slot n for the terminal operating in the resource allocation mode 2 in the sidelink-based communication system, the terminal may perform the resource selection procedure according to the following steps. The resource selection procedure described here will be described based on the contents described in the section 8.1.4 of TS 38.214, which is the 3GPP technical specification.

Step 1: Determine a candidate resource set $R_{x,y}$. Here, $R_{x,y}$ may be defined as consecutive $L_{subCH}$ subchannels starting from the $t_y$-th slot in the time domain and the x-th subchannel in the frequency domain within a resource pool configured to the terminal. That is, in the frequency domain, it may comprise subchannels x, x+1, x+2, . . . , and x+$L_{subCH}$. The terminal may determine the candidate resource set corresponding to $R_{x,y}$ existing in the resource pool within the time period corresponding to the resource selection window 420, that is, the entire time [n+$T_1$, n+$T_2$]. In this case, $T_1$ and $T_2$ may be defined as follows.

$T_1$ may be a value that satisfies '0≤$T_1$≤$T_{proc,1}$', and may be determined according to an implementation of the terminal. Here, $T_{proc,1}$ may be defined according to a subcarrier spacing as shown in Table 1 below.

TABLE 1

| $\mu_{SL}$ | $T_{proc,1}$ [slots] |
|---|---|
| 0 | 3 |
| 1 | 5 |
| 2 | 9 |
| 3 | 17 |

If a value of $T_{2min}$ is smaller than a remaining packet delay budget (PDB), a value of $T_2$ may be determined according to an implementation of the terminal as a value satisfying '$T_{2min}$≤$T_2$≤remaining PDB'. If the value of $T_{2min}$ is greater than or equal to the remaining PDB, the value of $T_2$ may be determined as the remaining PDB.

The number of candidate resources within the candidate resource set determined through Step 1 described above may be defined as $M_{total}$.

Step 2: Determine the resource sensing window 410. The resource sensing window 410 may be defined as [n–$T_0$, n–$T_{proc,0}^{SL}$], where $T_0$ may correspond to a value set by a parameter sl-SensingWindow from the higher layer, and $T_{proc,0}^{SL}$ may be defined according to the subcarrier spacing as shown in Table 2 below.

TABLE 2

| $\mu_{SL}$ | $T_{proc,0}^{SL}$[slots] |
|---|---|
| 0 | 1 |
| 1 | 1 |
| 2 | 2 |
| 3 | 4 |

The terminal may monitor a PSCCH in the slots corresponding to the resource pool within the resource sensing window 410 as described in steps S502 and S054 of FIG. 5 above, and may measure RSRPs of the PSCCH and a PSSCH corresponding thereto. In this case, a resource used by the terminal for its transmission within the resource sensing window 410 may be excluded from the sensing.

Step 3: The terminal may determine an initial threshold parameter Th($p_i$,$p_j$). The value of Th($p_i$,$p_j$) may be determined as the i-th value configured using a parameter sl-ThresPSSCH-RSRP-List, and in this case, i may be defined as i=$p_i$+($p_j$–1)*8.

Step 4: The terminal may initialize a resource set $S_A$. In this case, $S_A$ may be initialized with all possible candidate resources $R_{x,y}$.

Step 5: The terminal may exclude candidate resources $R_{x,y}$ satisfying the following conditions from the resource set $S_A$.

Condition 1: Slot $t'_m{}^{SL}$ which has not been monitored by the terminal in Step 2

Condition 2: When it is assumed that a first Sidelink Control Information (SCI) format (or SCI format 1-A) is received in the slot $t'_m{}^{SL}$ that the terminal has not monitored, and slots all sub-channels within the resource pool, which correspond to an arbitrary period value indicated by a 'Resource reservation period' field of the first SCI format among period values set by a higher layer parameter sl-ResourceReservePeriodList, are resource-allocated, a case where a condition c of Step 6 to be described below is satisfied Step 6: The terminal may exclude the candidate resources $R_{x,y}$ satisfying the following condition from the resource set $S_A$.

Condition a: The terminal receives the first SCI format in the slot $t'_m{}^{SL}$, the 'Resource reservation period' field of the first SCI format indicates a value of $P_{rsvp\_RX}$, and a 'Priority' field thereof indicates a $prio_{RX}$.

Condition b: An RSRP value measured for the first SCI format is greater than Th ($prio_{RX}$, $prio_{TX}$).

Condition c: Resources overlapping with the candidate resources $$R_{x,y+j\times P'_{rsvp\_TX}}(j = 0, 1, \ldots, C_{resel-1})$$

among slots and a set of resource blocks determined by the first SCI format received in the slot $t_m{}^{SL}$ or the first SCI format that is considered to be received in a slot $$t^{SL}_{m+q\times P'_{rsvp\_RX}}(q = 1, 2, \ldots, Q)$$

according to the period value indicated by the 'Resource reservation period' field. Here, Q is defined as $$Q = \left\lceil \frac{T_{scal}}{P_{rsvp\_RX}} \right\rceil,$$

and $T_{scal}$ corresponds to a value obtained by converting the length of the resource selection window 420, $T_2$, in milliseconds (msec).

Step 7: If the number of remaining candidate resources in the resource set $S_A$ is less than X·$M_{total}$, the terminal may increase the value of Th($p_i$,$p_j$) by 3 dB, and may perform the procedure again from Step 4.

The terminal may report the resource set $S_A$ determined through the above procedure to the higher layer.

If a resource $r_i$ in ($r_0$, $r_1$, $r_2$, . . . ), which is a target resource for re-evaluation, is not included the resource set $S_A$, the terminal may report re-evaluation of the corresponding resource $r_i$ to the higher layer.

If a resource $r'_i$ in ($r'_0$, $r'_1$, $r'_2$, . . . ), which is a target resource for pre-emption, is excluded according to Step 6 above, is not included in the resource set $S_A$, and satisfies at least one of the following conditions, the terminal may report pre-emption of the resource $r'_i$ to the higher layer.

Condition 1: A parameter sl-PreemptionEnable is set to 'enable' and '$prio_{TX}$>$prio_{RX}$' is satisfied Condition 2: When the parameter sl-PreemptionEnable is set but not set to 'enable', and both '$prio_R X$<$prio_{pre}$' and '$prio_{TX}$>$prio_{RX}$' are satisfied FIG. 6 is a conceptual diagram for describing a resource indication and sensing operation based on two-stage SCI in sidelink communication.

In SL communication, two-stage SCI has been adopted in order to perform more efficient resource sensing of a terminal.

Figure 6:
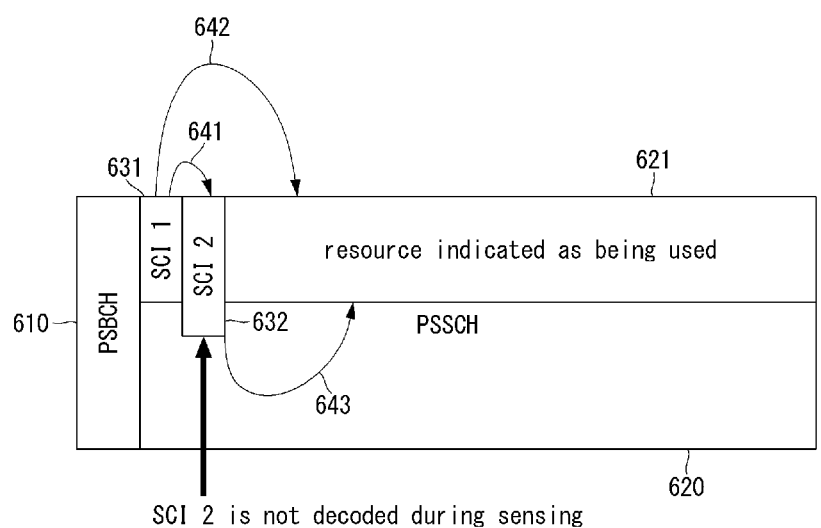
FIG. 6 is a conceptual diagram for describing a resource indication and sensing operation based on two-stage SCI in sidelink communication.

Referring to FIG. 6, a physical sidelink broadcast channel (PSBCH) 610 and a physical sidelink shared channel (PSSCH) 620 are illustrated. Two-stage SCI 631 and 632 may be transmitted on a physical sidelink control channels (PSCCHs) (not shown in FIGS. 6A and 6B) and the PSSCH 620.

In the present disclosure described below, with respect to the SCI 1 631 shown in FIG. 6 may be referred to as 'SCI 1', 'SCI format 1', 'first SCI', '$1^{st}$-stage SCI', or 'first stage SCI', and all of them may be understood in the same meaning. In addition, the SCI 2 632 shown in FIG. 6 may be referred to as 'SCI 2', 'SCI format 2', 'second CSI', '$2^{nd}$-stage SCI', or 'second-stage SCI', and all of them may be understood in the same meaning. However, the SCI 2 632 may have two different types as described below.

Information included in the first SCI (i.e., SCI 1 ($1^{st}$-stage SCI) 631) may defined as an SCI format 1-A in the Rel-16 of 3GPP TS 38.212 as shown in Table 3 below.

TABLE 3

| Field | Bit Size |
| --- | --- |
| Priority | 3 |
| Frequency resource assignment | $\left\lceil \log_2\left(\frac{N_{subChannel}^{SL}(N_{subChannel}^{SL}+1)}{2}\right)\right\rceil$ or $\left\lceil \log_2\left(\frac{N_{subCharel1}^{SL}(N_{subChannel1}^{SL}+1)(2N_{subChannel1}^{SL}+1)}{6}\right)\right\rceil$ |
| Time resource assignment | 5 or 9 |
| Resource reservation period | $\lceil \log_2 N_{rsv\_period}\rceil$ |
| DMRS pattern | $\lceil [\log_2 N_{pattern}\rceil$ |
| 2nd-stage SCI format | 2 |
| Beta_offset indicator | 2 |
| Number of DMRS port | 1 |
| Modulation and coding scheme (MCS) | 5 |
| Additional MCS table indicator | 1, 2 or 0 |
| PSFCH overhead indication | 1 or 0 |
| Reserved | 2, 3 or 4 |

Each field shown in Table 3 will be briefly described. A priority field indicates priority control information of data or information transmitted on the PSSCH 620, a frequency resource assignment field indicates information on subchannel(s) for two or three transmission resources, a time resource assignment field indicates information on slot offset(s) for additional one or two transmission resources other than the SCI 1 631, a resource reservation period field indicates a time period using the same resources, and a DMRS pattern field indicates a pattern of DMRS(s) transmitted as being included in the PSSCH 620. In addition, an SCI 2 format ($2^{nd}$-stage SCI format) field indicates a format of the SCI 2 632, a beta_offset indicator field indicates an index value based on BetaOffsets2ndSCI of higher layer signaling, a 'number of DMRS ports' field indicates the number of DMRS ports, a modulation and coding scheme (MCS) field indicates a modulation and coding scheme, an additional MCS table indicator field indicates an additional MCS table, and a physical sidelink feedback channel (PSFCH) overhead indication field indicates information indicating whether PSFCH transmission is included.

As illustrated above, the SCI 1 631 may include information related to the SCI 2 632 and information related to the PSSCH 620. For example, the SCI 1 631 may indicate information related to the SCI 2 ($2^{nd}$ stage SCI) 632, which is the second SCI, as shown by a reference numeral 641. In addition, the SCI 1 631 may include information on resources to be used as indicated by a reference numeral 642.

The SCI 2 632 may include information related to the PSSCH 620, and may provide information related to resources to be used used as a reference numeral 621, for example, a specific resource region as indicated by a reference numeral 643. The SCI 2 632 may be defined as having an SCI format 2-A or SCI format 2-B in the Rel-16 of 3GPP TS 38.212. The SCI format 2-A may include information shown in Table 4 below, and the SCI format 2-B may include information shown in Table 5 below.

TABLE 4

| Field | Bit Size |
| --- | --- |
| HARQ process number | 4 |
| New data indicator | 1 |
| Redundancy version | 2 |
| Source ID | 8 |
| Destination ID | 16 |
| HARQ feedback enabled/disabled indicator | 1 |
| Cast type indicator | 2 |
| CSI request | 1 |

TABLE 5

| Field | Bit Size |
| --- | --- |
| HARQ process number | 4 |
| New data indicator | 1 |
| Redundancy version | 2 |
| Source ID | 8 |
| Destination ID | 16 |
| HARQ feedback enabled/disabled indicator | 1 |
| Zone ID | 12 |
| Communication range requirement | 4 |

Meanwhile, as illustrated in FIG. 6, the SCI 2 632 is not decoded when sensing is performed. The main advantages of the two-stage SCI shown in FIG. 6 may include a reduction in complexity of the terminal performing resource sensing and removal of the need for blind decoding for multiple aggregation levels. The terminals performing resource sensing can significantly reduce resource sensing complexity and power consumption by only demodulating the SCI 1 631, which is the first SCI including resource allocation information for the PSCCH.

Figure 7:
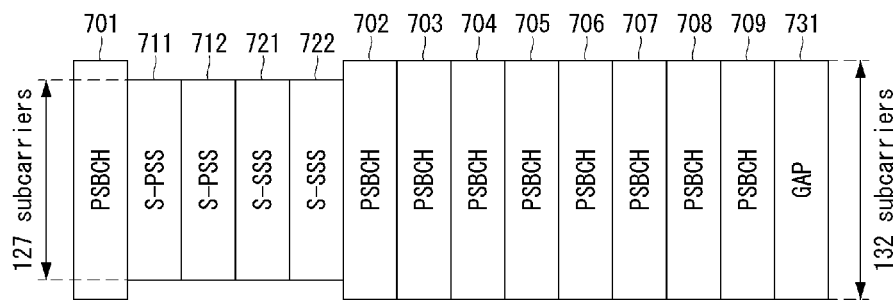
FIG. 7 is a conceptual diagram for describing a structure of a sidelink synchronization signal block in the 5G NR mobile communication system.

FIG. 7 is a conceptual diagram for describing a structure of a sidelink synchronization signal block in the 5G NR mobile communication system.

The sidelink synchronization signal block (SSB) illustrated in FIG. 7 exemplifies a normal cyclic prefix (CP) case. In FIG. 7, a horizontal axis may be a time axis and a vertical axis may be a frequency axis. In the NR communication system, a subcarrier spacing (SCS) varies according to a numerology, and a normal CP or extended CP may be used based on a delay spread. One slot having a normal CP, which comprises an SSB, may consist of 14 OFDM symbols as illustrated in FIG. 7.

Referring to FIG. 7, a PSBCH is transmitted in a first symbol 701 on the time axis, a sidelink primary synchronization signal (S-PSS) is transmitted in a second symbol 712 and a third symbol 613, and a sidelink secondary synchronization signal (S-SSS) is transmitted in a fourth symbol 721 and a fifth symbol 722. In addition, the PSBCH is transmitted in 8 symbols 702 to 709 thereafter. The last symbol 631 is a gap (GAP), which is generally called a guard, and no data is transmitted therein.

Meanwhile, although not illustrated in FIG. 7, in the extended CP case in which one slot consists of 12 OFDM symbols, an S-SSB may consist of 2 S-PSS symbols, 2 S-SSS symbols, and 7 PSBCH symbols. That is, in the extended CP case, two fewer PSBCH symbols are used as compared to the normal CP case. In both the cases of having the normal CP and having the extended CP, no signal is transmitted in the last symbol of the slot.

In addition, as illustrated in FIG. 7, the PSBCH symbols 701 and 702-709 are composed of 132 subcarriers, and the S-PSS symbols 711 and 712 and the S-SSS symbols 721 and 722 are composed of 127 subcarriers. Accordingly, it can be seen that the S-SSB is transmitted through 11 resource blocks (RBs) within a sidelink bandwidth part (SL BWP).

Meanwhile, when the S-PSS, S-SSS, and PSBCH are transmitted based on the S-SSB structure defined in the existing technical specifications, period (160 ms), and number of S-SSBs transmittable within one period, a transmitting subject of S-SSBs (e.g., synchronization signal transmitting terminal) may perform transmission thereof using a beam sweeping scheme in an FR2 high frequency band.

The synchronization signal transmitting terminal that transmits S-SSBs by sweeping a plurality of beams in a high frequency band as descried above may transmit a signal having the S-SSB structure illustrated in FIG. 7 for each beam within a period of 160 ms, which is an S-SSB transmission period. For example, when 8 S-SSBs are configured to be transmitted during a period of 160 ms, the synchronization signal transmitting terminal may transmit 8 S-SSBs using available beams within the S-SSB transmission period.

The sidelink synchronization information described in FIG. 7 may be transmitted by a synchronization reference terminal (i.e., SyncRef UE) in order to extend a synchronization range of a synchronization source and to have the same sidelink timing reference between adjacent terminals (UEs). Through this, SL terminals may perform SL communication with the SyncRef UE as well as SL communication with adjacent SL terminals.

As illustrated in FIG. 7, the sidelink synchronization information may be transmitted through the SL SSB composed of the PSBCH 701, the S-PSS 711 and 712, and the S-SSS 721 and 722. The S-SSB occupies one slot and uses the same numerology as the SL BWP, that is, the same numerology as the PSCCH/PSSCH. In addition, the PSBCH, S-PSSS, and S-SSS are allocated to symbols 0 to 12 in an S-SSB slot in the normal CP case, and allocated to symbols 0 to 10 in an S-SSB slot in the extended CP case.

A payload of the PSBCH 701 excluding CRC bits may be configured as follows.

In-coverage indicator of 1 bit
TDD configuration of 12 bits
Direct Frame Number (DFN) of 10 bits
A slot index of 7 bits;
2-bit reserved field In addition, the S-SSB is not transmitted in a slot of a resource pool and is not multiplexed in the frequency domain with other SL physical channels within the SL BWP.

As illustrated in FIG. 7, the S-SSB may span over 11 ($M_{S-SSB}$=11) common RBs in the frequency domain within the SL BWP. Accordingly, the S-SSB is allocated to a total of 132 subcarriers. Since a frequency location of the S-SSB is (pre)configured within the SL BWP, the terminal does not need to perform blind detection to find the S-SSB in the frequency domain.

Hereinafter, sidelink HARQ feedback will be reviewed.

An HARQ feedback for a transport block (TB) transmitted on the PSSCH 620 is transmitted on a PSFCH within the same resource pool. To disable HARQ feedback for all SL transmissions in the resource pool, PSFCH resources should not be configured in the resource pool. The PSFCH resource(s) may be (pre)configured with a periodicity of NPSFCH (=1, 2 or 4 slots). This means that there is a PSCCH/PSSCH slot having PSFCH symbol(s) for every NPSFCH slots within the resource pool. Even if PSFCH resource(s) are (pre-) configured, as illustrated in Table 4 and Table 5, an HARQ feedback for the corresponding TB may be activated or deactivated using the SCI format 2.

Meanwhile, SL technical specifications prior to Rel-17 of the 3GPP standard meeting did not explicitly support a beam management technique for FR2 corresponding to a high frequency band. However, according to the contribution RP-213678 discussed at the 3GPP RAN#94-e meeting in December 2021, standardization of SL beam management operation methods in an FR2 licensed band is promoted in Rel-18. According to the contribution of RP-213678, Rel-18 basically reuses the current SL CSI framework and beam management techniques applied to the NR Uu links as much as possible. Through this, it is planned to support SL beam management operations including initial transmission beam selection, beam change, and beam failure recovery procedures in the SL. Although, according to the contents discussed so far, the Rel-18 standardization work for the beam management technique is planned to be limited to the unicast scheme, but in the standardization after Rel-19, the beam management techniques for the broadcast and groupcast schemes may also be discussed.

Therefore, in the present disclosure described below, a series of communication methods and procedures required to efficiently perform SL transmission in a beam-based SL communication environment are proposed.

In NR SL communication, one SL BWP may be (pre-) configured within a carrier bandwidth, and it may be used for both SL transmission and reception. In the SL BWP, a resource pool, which is a resource region in which transmission and reception of SL physical channels and physical signals are actually performed, is defined, and one or more resource pools may be configured within the SL BWP. Resource sensing and resource selection performed by a terminal operating in the SL resource allocation mode 2 may performed on resources within a resource pool, and the terminal may commonly use one resource pool for unicast, group cast, and broadcast schemes.

In the present disclosure, a method for dividing beams available for SL communication into one or more beam groups, and assigning different radio resources to the respective beam groups is proposed. Here, the radio resource may mean a carrier bandwidth or a resource pool. In other words, the same or different carrier bandwidths or resource pools may be allocated for the respective beam groups. This has the effect of limiting the number of beams to be managed for each allocated radio resource, thereby reducing the complexity of beam management.

Figure 8:
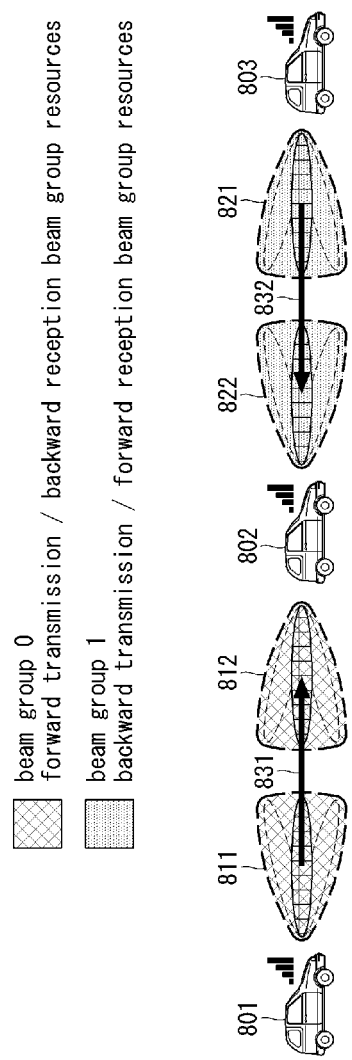
FIG. 8 is a conceptual diagram illustrating a case in which beams are divided into a forward beam group and a backward beam group and different radio resources are allocated to the respective beam groups according to an exemplary embodiment of the present disclosure.

FIG. 8 is a conceptual diagram illustrating a case in which beams are divided into a forward beam group and a backward beam group and different radio resources are allocated to the respective beam groups according to an exemplary embodiment of the present disclosure.

Referring to FIG. 8, three different vehicles 801, 802, and 803 traveling in a line are illustrated. It is assumed that the frontmost vehicle 803, the middle vehicle 802, and the rearmost vehicle 801 all perform SL communications according to the present disclosure. In this case, the middle vehicle 802 performs SL communication with the rearmost vehicle 801, and the middle vehicle 802 may be a terminal receiving (831) data from the rearmost vehicle 801. In addition, the middle vehicle 802 performs SL communication with the frontmost vehicle 803, and the middle vehicle 802 may be a terminal receiving (832) data from the frontmost vehicle 803.

In terms of the middle vehicle 802, a forward beam group 822 may correspond to a beam group 1 communicating with a backward beam group 821 of the frontmost vehicle 803, and as illustrated in FIG. 8, it may correspond to backward transmission/forward reception beam group resources. In terms of the middle vehicle 802, a backward beam group 812 may correspond to a beam group 0 communicating with a forward beam group 811 of the rearmost vehicle 801, and as illustrated in FIG. 8, it may correspond to forward transmission/backward reception beam group resources.

As illustrated in FIG. 8, one vehicle may include a forward beam and a backward beam or a forward beam group and a backward beam group. Additionally, a left beam and/or a right beam in the vehicle traveling direction may be further included. Additionally, a left beam group and/or a right beam group in the vehicle traveling direction may be further included. In the following description, the case of the forward beam and the backward beam and/or the case of forward beam group and the backward beam group will be assumed to reduce the complexity of the description. However, it will be apparent that the case of further including the left beam group (or left beam) and the right beam group (or right beam) may also be added based on the description of the present disclosure.

Each of exemplary embodiments described below may be used alone, or at least a part of each exemplary embodiment may be used in combination with other exemplary embodiments. In addition, in describing each of exemplary embodiments below, a terminal may mean a terminal that performs SL communication or can perform SL communication. For example, when a vehicle terminal or a vehicle is exemplified, it may be understood as a terminal performing SL communication. In addition, the term 'user equipment (UE)' mainly used in the 3GPP specifications may be used interchangeably with the term 'terminal'.

Exemplary Embodiment 1: Beam Configuration for Each Resource Pool

In the first exemplary embodiment of the present disclosure, a beam configuration method for each resource pool will be described. The beam configuration method for each resource pool according to the first exemplary embodiment of the present disclosure may apply at least one of the following four methods.

First, an SL communication terminal according to the present disclosure may divide a set of available beams thereof into one or more beam groups, and each beam group may include one or more beams.

Second, an SL communication terminal according to the present disclosure may allocate a carrier bandwidth or resource pool for each beam group.

According to the present disclosure, when a carrier bandwidth is allocated for each beam group, component carriers (CCs) may be differently allocated for the respective beam groups, or the same CC may be simultaneously allocated to different beam groups.

In the case of allocating a resource pool for each beam group according to the present disclosure, some subchannel resources in a resource pool allocated to a beam group may be configured to overlap a resource pool of another beam group. A case in a resource pool allocated to a beam group is configured to overlap a resource pool of another beam group will be described with reference to FIG. 9A described below.

Third, in the present disclosure, a transmission resource pool and a reception resource pool of a beam group may be configured to be the same or different from each other.

Fourth, the terminal may perform a beam management mechanism for a configured resource pool. When performing an SL beam management procedure, beam(s) not allocated to the resource pool in use may be omitted.

FIG. 9A is a conceptual diagram for describing a case of allocating resources for each beam group from a resource pool of a vehicle terminal (hereinafter referred to as 'terminal') performing SL communication.

Referring to FIG. 9A, a terminal 901 may include a backward beam group 940 and a forward beam group 950 as described in FIG. 8. In the following description, it is assumed that the forward beam group is referred to as a beam group 0 and the backward beam group is referred to as a beam group 1. In addition, FIG. 9A exemplifies a case in which the backward beam group 940 may include beams 941, 942, and 943 in three different directions, and the forward beam group 950 may include beams 951, 952, and 953 in three different directions.

In FIG. 9A, a graph at the bottom is an example for describing resource pools, a vertical axis thereof represents frequency resources, and a horizontal axis thereof represents time resources. An SL BWP may be included within a carrier bandwidth on the frequency axis. In addition, a resource pool period for allocating resources on the time axis is exemplified.

A plurality of resource pools are exemplified within the resource pool period in the SL BWP, and resources of the beam group 0 and resources of the beam group 1 are exemplified in different forms. One resource 920 included in the beam group 0 and one resource 910 included in the beam group 1 may be arranged so that they do not overlap each other, and as shown by a reference numeral 930, a case in which resource(s) of the beam group 0 and resource(s) of the beam group 1 are overlapped may also occur.

Figure 9B:
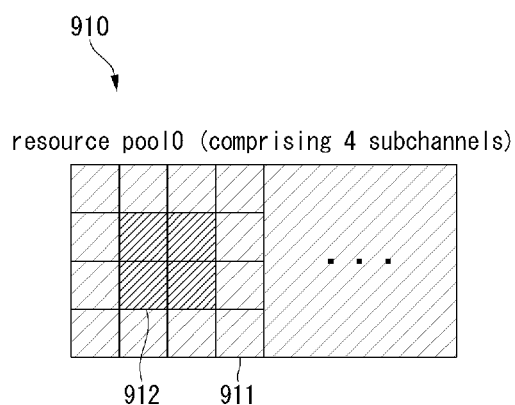
FIG. 9B is a conceptual diagram of resources of a resource group 0 according to the present disclosure.

FIG. 9B is a conceptual diagram of resources of a resource group 0 according to the present disclosure.

Referring to FIG. 9B, a resource pool 0 may be configured with 4 subchannels. In addition, PRBs transmitted in one subchannel may be configured as $n_{subCHsize}$ PRBs. In addition, even if one resource corresponding to the resource pool 0 is selected, data may be actually transmitted/received during a time when two symbols are transmitted in two subchannels, as shown by a reference numeral 912 expressed in bolder.

Figure 9C:
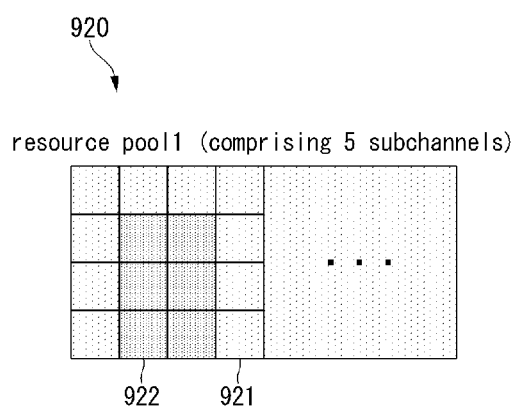
FIG. 9C is a conceptual diagram for resources of a resource group 1 according to the present disclosure.

FIG. 9C is a conceptual diagram for resources of a resource group 1 according to the present disclosure.

Referring to FIG. 9C, a resource pool 1 may be configured with 5 subchannels. In addition, PRBs transmitted in one subchannel may be configured as $n_{subCHsize}$ PRBs as described in FIG. 9B. In addition, even if one resource 920 corresponding to the resource pool 1 is selected, the transmitting terminal may actually transmit/receive data during a time when two symbols are transmitted in four subchannels, as shown by a reference numeral 922 expressed in bolder.

In addition, the beam management mechanism procedure will be briefly described with reference to FIG. 9A again. It has been mentioned above that beams not allocated to the resource pool in use may be omitted when performing the SL beam management procedure. Referring to FIG. 9A, it is assumed that the terminal 901 allocates the forward beam group 950 and the backward beam group 940 to different beam groups and uses different resource pools therefor. Accordingly, the terminal 901 may exclude the beams 941, 942, and 943 of the backward beam group when performing the beam management mechanism on the forward beam group 950. The same may be applied to the opposite case. For example, the terminal 901 may exclude the beams 951, 952, and 953 of the forward beam group when performing the beam management mechanism on the backward beam group.

Meanwhile, the S-SSBs described above may be transmitted through different beams, similarly to SSBs of the NR Uu. The S-SSB structure is similar to the SSB structure of the NR Uu, but SSB transmission of a base station gNB is utilized in an initial access procedure of NR Uu, whereas such the procedure is not defined in the NR V2X sidelink. In the NR Uu, a terminal may identify an optimal downlink beam by receiving and measuring SSBs for the respective beams. In addition, in the NR Uu, the terminal may inform the base station of the optimal downlink beam by transmitting a physical random access channel (PRACH) to the base station through an uplink random access procedure. Through this procedure, the base station may identify the terminal that wants to access its own network, and recognize the optimal downlink beam for the corresponding terminal.

However, in NR V2X sidelink communication, there is no similar procedure after S-SSB transmission, which corresponds to that of the NR Uu. Therefore, a synchronization reference terminal (i.e., SyncRef UE) or transmitting terminal that transmits S-SSBs cannot recognize a terminal that has received the S-SSB(s) transmitted by itself, and a method for knowing an optimal beam for a corresponding receiving terminal does not exist.

Exemplary Embodiment 2: Per-Beam S-SSB Transmission for Unicast Initial Beam Pairing In the second exemplary embodiment of the present disclosure, a per-beam S-SSB transmission method for unicast initial beam pairing will be described. For the per-beam S-SSB transmission method for unicast initial beam pairing according to the second exemplary embodiment of the present disclosure, at least one of the following four methods may be applied.

First, when a transmitting terminal is not a synchronization reference (SyncRef) terminal, the transmitting terminal does not necessarily need to transmit S-SSB(s). However, when operating as a transmitting terminal in beam-based SL unicast communication according to the present disclosure, the transmitting terminal may transmit S-SSB(s) for initial beam pairing with a receiving terminal.

Second, a transmitting terminal may use 1 bit of the 2-bit reserved field of the PSBCH payload, which is currently unused in the Rel-16 3GPP specification, as an initial beam pairing flag for initial beam pairing with the receiving terminal. The 1-bit initial beam pairing flag may be used to inform the receiving terminal that S-SSB(s) transmitted by the transmitting terminal performing unicast communication are transmitted for initial beam pairing for unicast communication. When the receiving terminal communicating with the transmitting terminal receives the S-SSB(s) in which the initial beam pairing flag is set, the receiving terminal may perform a beam pairing procedure with the transmitting terminal. In addition, terminals that do not communicate with the transmitting terminal may not receive the S-SSB(s) based on the initial beam pairing flag. The method of setting the initial beam pairing flag may be configured in the following schemes.

(1) The initial beam pairing flag set to 1 indicates S-SSB transmission for initial beam pairing of unicast communication.

(2) The initial beam pairing flag set to 0 indicates S-SSB transmission for performing the role of SyncRef UE.

Third, basically, the S-SSB is transmitted at a fixed periodicity of $T_{S-SSB}$=160 ms (16 frames). However, in the initial beam pairing step of unicast communication, it may be transmitted with a smaller periodicity to perform more rapid beam sweeping. The initial beam pairing step corresponds to the case when the flag value is set to 1 as described in the second method of the second exemplary embodiment of the present disclosure, and in this case, the periodicity for S-SSB transmission may be set to be short. According to an exemplary embodiment of the present disclosure, the S-SSB periodicity value $T_{S-SSB}$ in the initial beam pairing step may be (pre-)configured by a higher layer. If the (pre-)configuration is not performed by the higher layer, $T_{S-SSB}$ may be set to 160 ms. In the following description, the case of $T_{S-SSB}$=160 ms will be described as a default value or an agreed default value.

Fourth, a transmitting terminal may transmit a plurality of S-SSBs within one period, and each S-SSB may be transmitted through a different beam.

The number of S-SSBs that can be transmitted by the transmitting terminal within one S-SSB transmission period may be determined based on higher layer signaling.

Through the methods described above, the transmitting terminal according to the present disclosure may transmit the S-SSB for each beam during unicast initial beam pairing, and the receiving terminal may receive the S-SSB for each beam.

Exemplary Embodiment 3: Per-Beam S-SSB Reception and Response Signal Transmission for Unicast Initial Beam Pairing In the third exemplary embodiment of the present disclosure, two contents will be largely dealt with. First, an operation of receiving per-beam S-SSBs for unicast initial beam pairing by a receiving terminal will be described. Second, an operation of transmitting a response signal by the receiving terminal in response to the received per-beam S-SSB will be described.

[1] Operation of Receiving, by the Receiving Terminal, a Per-Beam S-SSB for Unicast Initial Beam Pairing An operation of receiving, by the receiving terminal, a per-beam S-SSB for unicast initial beam pairing will be described. There may be two methods for receiving the S-SSB for each beam by the receiving terminal.

First, when the receiving terminal can form a plurality of reception beams, the receiving terminal may receive S-SSB(s) by performing beam sweeping using the plurality of reception beams in the same manner as that of a transmitting terminal transmitting S-SSBs by performing beam sweeping.

Second, even though a plurality of reception beams can be formed, the receiving terminal may select a specific preferred beam, and receive S-SSBs transmitted by the transmitting terminal through beam sweeping using the selected preferred beam.

[2] Operation of Transmitting, by the Receiving Terminal, a Response Signal in Response to the Received S-SSB The receiving terminal may select an optimal beam (or a beam preferred by the receiving terminal) among beams of the transmitting terminal by receiving the per-beam S-SSBs for initial beam pairing transmitted by the transmitting terminal, and inform it to the transmitting terminal through a response signal. A method of informing an optimal beam index according to the present disclosure may be implemented in one or a combination of the following three schemes.

A. Beam Pairing Response Scheme 1 (Using S-SSB)

The first response scheme according to the present disclosure is a scheme in which the receiving terminal responds by transmitting an S-SSB. The receiving terminal may inform the transmitting terminal of an index of its preferred beam (or optimal beam) by transmitting a response signal using an S-SSB. Since the corresponding operation of the receiving terminal is also performed as part of the initial beam pairing operation, the initial beam pairing flag in the transmitted S-SSB may be set to 1 as described in the second exemplary embodiment above.

In a first exemplary embodiment of the beam pairing response scheme, the following two solutions are possible based on the number of S-SSBs that can be allocated within the S-SSB period and the number of beams of the transmitting terminal.

Solution 1

The first solution according to the present disclosure may be used when the number of beams of the transmitting terminal is the same as the number of S-SSBs that can be allocated within the S-SSB period, or when the number of S-SSBs that can be allocated within the S-SSB period is insufficient to receive the response S-SSB from the receiving terminal. This will be described with reference to the attached FIGS. 10A to 10D.

Figure 10A:
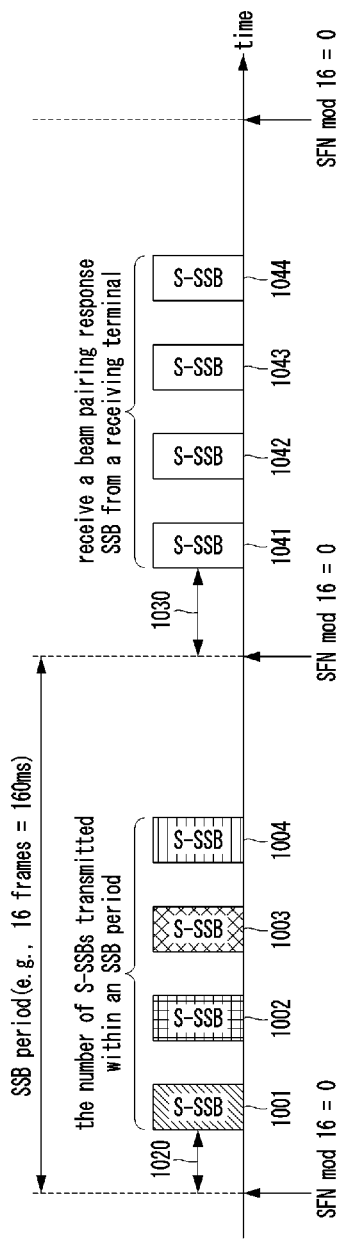
FIG. 10A is a timing diagram for describing S-SSB transmission for beam pairing between a transmitting terminal and a receiving terminal according to the present disclosure.

FIG. 10A is a timing diagram for describing S-SSB transmission for beam pairing between a transmitting terminal and a receiving terminal according to the present disclosure.

Referring to FIG. 10A, a transmitting terminal may configure one beam group including at least one beam as described in the first exemplary embodiment, and transmit S-SSB(s) through the corresponding beam group as described in the second exemplary embodiment. In this case, as described in the second exemplary embodiment, an S-SSB period may be configure to have a shorter period than the default period. In the second exemplary embodiment, the default period has been described as 160 ms. In other words, it may correspond to a case of having 16 frames. Assuming that the S-SSB period illustrated in FIG. 10A is the default period (16 frames=160 ms), four S-SSBs 1001, 1002, 1003, and 1004 may be transmitted within the default SSB period. The S-SSB period may be started at a time where a value obtained by a modulo operation (e.g., system frame number (SFN) mod 16) becomes 0.

In addition, the first S-SSB 1001 among the four S-SSBs 1001, 1002, 1003, and 1004 may be transmitted at a delayed location as indicated by a reference numeral 1020. A transmission offset $T_{IBP\_TX\_offset}$ for indicating the delayed location of the first S-SSB 1001 may be (pre-)configured by a higher layer.

A period of response S-SSBs 1041, 1042, 1043, and 1044 transmitted from the receiving terminal as beam pairing response signals may also start at a time when a value obtained by a modulo operation (e.g., SFN mod 16) becomes 0. As another example, the period of the response S-SSBs 1041, 1042, 1043, and 1044 may be a time when the default S-SSB period ends. A transmission time point of the first S-SSB transmitted by the receiving terminal may use the transmission offset $T_{IBP\_TX\_offset}$ or a reception offset $T_{IBP\_RX\_offset}$ different from the transmission offset, which is separately configured. FIG. 10A illustrates a case in which the transmission offset and the reception offset are different from each other. The reception offset indicating the transmission time point of the first S-SSB transmitted by the receiving terminal may be (pre-)configured by a higher layer.

The transmitting terminal may receive the S-SSBs transmitted by the receiving terminal as a beam pairing response signal to identify the optimal beam (or preferred beam) of the transmitting terminal at the receiving terminal.

Figure 10B:
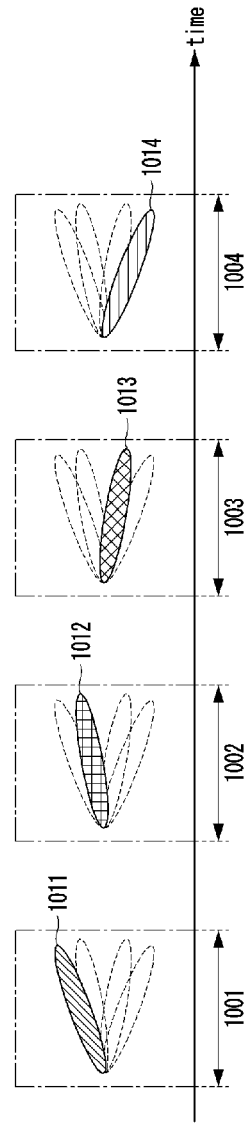
FIG. 10B is a conceptual diagram for describing a case in which a transmitting terminal transmits S-SSBs through beam sweeping according to the present disclosure.

FIG. 10B is a conceptual diagram for describing a case in which a transmitting terminal transmits S-SSBs through beam sweeping according to the present disclosure.

Referring to FIG. 10B, the transmitting terminal may transmit the S-SSBs 1001, 1002, 1003, and 1004 using the beams 1011, 1012, 1013, and 1014 of the selected beam group, respectively. Specifically, the first S-SSB 1001 may be transmitted through the first beam 1011 of the beam group, the second S-SSB 1002 may be transmitted through the second beam 1012 of the beam group, the third S-SSB 1003 may be transmitted through the third beam 1013 of the beam group, and the fourth S-SSB 1004 may be transmitted through the fourth beam 1014 of the beam group. Accordingly, the receiving terminal can receive S-SSBs transmitted through all beams in the beam group of the transmitting terminal. In addition, the receiving terminal may determine an optimal beam or a preferred beam based on received powers and/or received qualities of the S-SSBs received through respective beams.

Figure 10C:
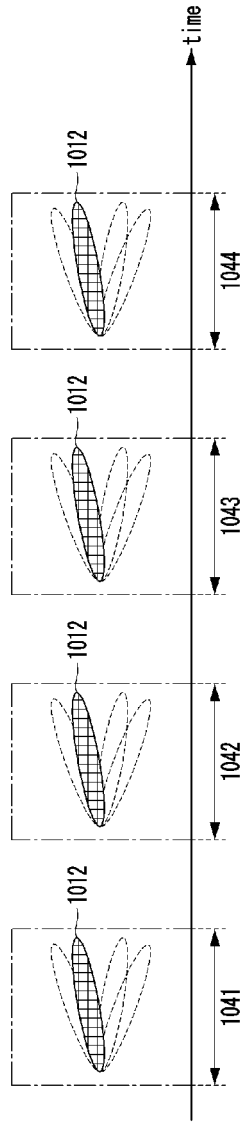
FIG. 10C is a conceptual diagram illustrating a case in which a transmitting terminal receives S-SSBs transmitted by a receiving terminal using a specific beam.

FIG. 10C is a conceptual diagram illustrating a case in which a transmitting terminal receives S-SSBs transmitted by a receiving terminal using a specific beam.

The transmitting terminal may receive a response S-SSB by sweeping beams in the same manner as when transmitting S-SSBs. As another example, the transmitting terminal may receive S-SSB(s) transmitted by the receiving terminal using a specific preferred beam. In this case, a beam preferred by the transmitting terminal and an optimal beam or preferred beam measured by the receiving terminal may be the same or different from each other. According to the example of FIG. 10C, it is assumed that the transmitting terminal receives the S-SSBs using the second beam 1012. Accordingly, the second beam 1012 may be a preferred beam of the transmitting terminal. As another example, the second beam 1012 may be a specific case belonging to the sweeping operation for response S-SSB reception.

In addition, the transmitting terminal may receive SSB(s) through the second beam 1012 at all the time points 1041, 1042, 1043, and 1044 described in FIG. 10A. In addition, the time points 1041, 1042, 1043, and 1044 described in FIG. 10A are time points when the receiving terminal transmits the first to fourth S-SSBs as response signals, respectively.

Figure 10D:
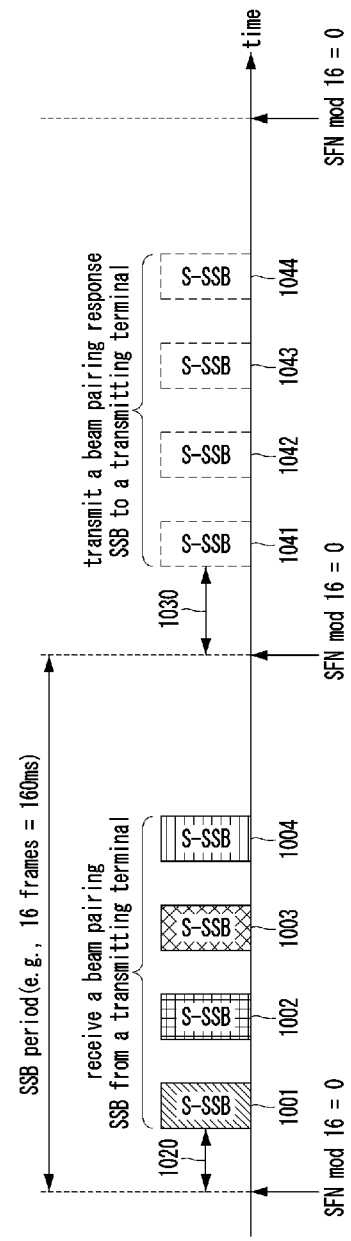
FIG. 10D is a timing diagram for describing an operation of receiving an S-SSB for initial beam pairing and transmitting a response S-SSB in terms of a receiving terminal.

FIG. 10D is a timing diagram for describing an operation of receiving an S-SSB for initial beam pairing and transmitting a response S-SSB in terms of a receiving terminal.

As described above with reference to FIG. 10A, the S-SSB period may be configured at a time when a value obtained by the modulo operation (SFN mod 16) becomes 0. The first SSB 1001 may be determined based on the transmission offset $T_{IBP\_TX\_offset}$. According to the present disclosure, the transmitting terminal may transmit four S-SSBs within the S-SSB default period. In this case, the transmitting terminal may transmit the S-SSBs 1001, 1002, 1003, and 1004 using different beams 1011, 1012, 1013, and 1014, respectively, as described above with reference to FIG. 10B.

The receiving terminal may receive the S-SSBs 1001, 1002, 1003, and 1004, select an optimal S-SSB among the received S-SSBs, and determine a beam corresponding to the optimal S-SSB as an optimal beam. In addition, the receiving terminal may transmit a beam pairing response S-SSB to the transmitting terminal. As described in FIG. 10A, the receiving terminal may transmit the response S-SSBs 1042, 1043, and 1044 in predetermined time units from the first response S-SSB 1041 after a time of the reception offset $T_{IBP\_RX\_offset}$.

As illustrated in FIG. 10A, the receiving terminal according to the present disclosure may inform the optimal beam or the most preferred beam to the transmitting terminal through all the response S-SSBs 1041, 1042, 1043, and 1044 within the response S-SSB transmission period. In this case, the response S-SSBs 1041, 1042, 1043, and 1044 transmitted from the receiving terminal to the transmitting terminal may all include one preferred beam index value.

According to another exemplary embodiment of the present disclosure, as illustrated in FIG. 10D, the receiving terminal may transmit the response S-SSB 1043 in a slot associated with the most preferred beam or the optimal beam corresponding to the optimal S-SSB among all the S-SSBs 1041, 1042, 1043, and 1044 within the response S-SSB period. In the present disclosure, when the S-SSBs 1001, 1002, 1003, and 1004 for beam pairing are transmitted through different beams as described in FIG. 10B, the transmission beams may be associated with the S-SSBs 1001, 1002, 1003, and 1004 for beam pairing, respectively. In addition, it may be assumed that the response S-SSBs 1041, 1042, 1043, and 1044 are sequentially associated with the S-SSBs 1001, 1002, 1003, and 1004 for beam pairing, respectively.

Under this assumption, it will be described with reference to FIG. 10D. In the example of FIG. 10D, when the third beam 1013 among the four different transmission beams 1011, 1012, 1013, and 1014 transmitted by the transmitting terminal is the most optimal beam or the most preferred beam of the receiving terminal, the third beam 1013 may be associated with the third S-SSB 1003 for beam pairing. Also, as described above, the third S-SSB 1003 for beam pairing may be associated with the third response S-SSB 1043. Therefore, the receiving terminal may transmit only the third response S-SSB 1043 as illustrated in FIG. 10D as a method of informing the transmitting terminal that the third beam 1013 is the optimal beam. In this manner, when the receiving terminal transmits the response S-SSB through the beam associated with the most optimal beam, the transmitting terminal may identify the optimal beam even if the receiving terminal does not specifically transmit a beam index through the S-SSB. Therefore, since the receiving terminal does not transmit a plurality of response S-SSBs, power consumption of the receiving terminal can be reduced.

Solution 2

The second solution may be used when since the number of beams of the transmitting terminal is smaller than the number of S-SSBs that can be allocated within the S-SSB period, it is sufficient for the transmitting terminal to transmit the S-SSBs of the transmitting terminal and receive the S-SSB response signal of the receiving terminal. In the above case, the initial beam pairing procedure may be performed within the S-SSB period. This will be described with reference to the attached FIGS. 11A and 11B.

FIG. 11A is a timing diagram for describing an SSB-based unicast initial beam pairing procedure according to the second solution of the present disclosure.

Referring to FIG. 11A, the transmitting terminal may configure one beam group including at least one beam as described in the first exemplary embodiment, and transmit S-SSB(s) through the corresponding beam group as described in the second exemplary embodiment. In this case, as described in the second exemplary embodiment, the S-SSB period may be configured to have a shorter period than the default period. In the second exemplary embodiment, the default period has been described as 160 ms. In other words, it corresponds to a case of having 16 frames. Assuming that the S-SSB period illustrated in FIG. 11A is the default period (16 frames=160 ms), four S-SSBs 1001, 1002, 1003, and 1004 may be transmitted within the default S-SSB period. The S-SSB period may be started at a time when a value obtained by a modulo operation (i.e., SFN mod 16) becomes 0.

Meanwhile, as a difference from FIG. 10A, it is assumed in FIG. 11B that the number of S-SSBs that can be allocated within an S-SSB period is 32. In this case, as described in FIG. 10B, it may be assumed that the transmitting terminal uses 4 beams also in the example of FIG. 11B1. Then, the 4 S-SSBs 1101, 1102, 1103, and 1104 for beam pairing illustrated in FIG. 11A may be sequentially transmitted through beam sweeping using different beams as shown in FIG. 10B.

In addition, a reference numeral 1120 in FIG. 11A indicates that the transmission offset $T_{IBP\_TX\_offset}$ for indicating a delayed location of the first S-SSB 1101 is (pre)configured by a higher layer as described in FIG. 10A.

On the other hand, the receiving terminal may transmit response S-SSBs 1141, 1142, 1143, and 1144 as beam pairing response signals. In this case, since it is sufficient to transmit the S-SSBs of the transmitting terminal within the S-SSB period and receive the response S-SSB signal of the receiving terminal as in the condition according to the second solution of the present disclosure, the receiving terminals may transmit the response S-SSBs.

For a time point at which the response S-SSB of the receiving terminal is received, a reception offset $T_{IBP\_RX\_offset}$ different from that of the first exemplary embodiment may be configured. The reception offset $T_{IBP\_RX\_offset}$ 1150 according to the second solution may be an offset between the transmission time point of the last S-SSB 1104 among the S-SSBs 1101, 1102, 1103, and 1104 transmitted by the transmitting terminal for beam pairing and a start time point of a transmission window of the response S-SSBs 1141, 1142, 1143, and 1143 of the receiving terminal.

In addition, the receiving terminal may use one of the scheme described in the first solution as a method of transmitting the response S-SSBs 1141, 1142, 1143, and 1143. For example, the receiving terminal may configure and notify the most preferred or optimal beam index for each of the S-SSBs 1141, 1142, 1143, and 1143.

Accordingly, the transmitting terminal may receive the S-SSB(s) transmitted by the receiving terminal as a beam pairing response signal, and based on information included in the received S-SSB(s), the transmitting terminal may identify the optimal beam (or preferred beam) of the transmitting terminal at the receiving terminal.

In FIG. 11A, a dotted line indicates locations where the S-SSB can be transmitted. In other words, a reference numeral 1145 illustrates a case in which actual transmission is not performed in a location where the S-SSB can be transmitted.

FIG. 11B is another timing diagram for describing an SSB-based unicast initial beam pairing procedure according to the second solution of the present disclosure.

When comparing FIG. 11A with FIG. 11B, there is no difference except that the transmission scheme of the S-SSBs 1141, 1142, 1143, and 1143 through which the response signal is transmitted is different. In other words, according to FIG. 11B, by transmitting one response S-SSB corresponding to the most preferred beam or the optimal beam within the transmission window of the response S-SSBs 1141, 1142, 1143, and 1143 of the receiving terminal, the most preferred beam or optimal beam index may be implicitly informed.

B. Beam Pairing Response Scheme 2 (Using PSFCH)

In the second response scheme according to the present disclosure, the receiving terminal may receive all initial beam pairing S-SSBs, and then report an index of a beam of the transmitting terminal, which is most preferred by itself, by using an earliest PSFCH that can be transmitted after slots corresponding to a feedback offset $T_{IBP\_PSFCH\_offset}$ from a slot in which the last S-SSB is received. A scheme of notifying a beam index using a PSFCH, which is the second response scheme of the present disclosure, may also use one or a combination of the following two solutions.

Solution 1

The first solution according to the present disclosure is to associate a cyclic shift value of a PSFCH (e.g., value α in the 3GPP specification) with a resource location of the S-SSB of the transmitting terminal, that is, the beam index of the transmitting terminal. Accordingly, the receiving terminal may inform the transmitting terminal of the optimal or preferred beam by transmitting the PSFCH whose cyclic shift value is set to a cyclic shift value mapped to the resource location of the S-SSB of the transmitting terminal through which the optimal or preferred beam is transmitted.

Solution 2

The second solution according to the present disclosure is to divide a frequency resource (PRBs or subchannels) to which the PSFCH is allocated into zones, and associate each zone with the resource location of the S-SSB of the transmitting terminal, that is, the beam index of the transmitting terminal. Therefore, the receiving terminal may inform the transmitting terminal of the optimal or preferred beam by allocating and transmitting the PSFCH in a frequency resource location mapped to the resource location of the S-SSB of the transmitting terminal through which the optimal or preferred beam is transmitted.

C. Beam Pairing Response Scheme 3 (Using SCI or MAC CE)

In the third response scheme according to the present disclosure, after the receiving terminal receives all of the initial beam pairing S-SSBs, the receiving terminal may report a beam index or an S-SSB resource index of the transmitting terminal, which is most preferred by itself, using SCI or MAC CE that can be transmitted earliest after slots corresponding to an SCI offset $T_{IBP\_SCI\_offset}$ from a slot in which the last S-SSB is received. In case of the SCI used as a response to the S-SSB in the present disclosure, 1st-stage SCI carried on a PSCCH or 2nd-stage SCI carried on a PSSCH may be used.

Method of Responding Using 1st-Stage SCI

According to the present disclosure, when transmitting information for responding to the S-SSB for pairing using 1st-stage SCI, the receiving terminal may inform the transmitting terminal of an index of the optimal beam or an S-SSB resource index corresponding to the optimal beam by varying a frequency location of a PSCCH. Alternatively, the receiving terminal may inform the transmitting terminal of the index of the optimal beam by directly including the information for responding to the S-SSB for pairing in the 1st-stage SCI format.

Method of Responding Using 2nd-Stage SCI or MAC CE

According to the present disclosure, when transmitting information for responding to the S-SSB for pairing using $2^{nd}$-stage SCI or MAC CE, the receiving terminal may directly inform the transmitting terminal of an index of the optimal beam by including the index of the optimal beam or an S-SSB resource index corresponding to the optimal beam in the $2^{nd}$-stage SCI or MAC CE.

Based on the above description, when the initial beam pairing step is completed, the two terminals, that is, the transmitting terminal and the receiving terminal may perform unicast communication. In addition, the transmitting terminal and the receiving terminal may perform the SL beam management procedure periodically or non-periodically while performing communication.

Figure 12:
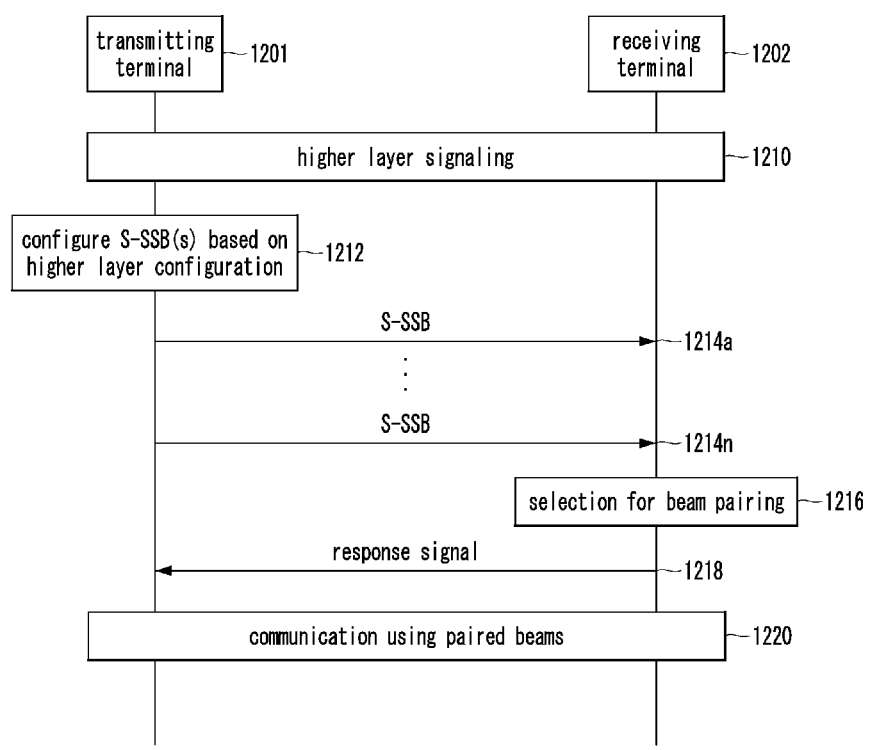
FIG. 12 is a sequence chart for a case in which beam pairing is performed in SL unicast communication according to an exemplary embodiment of the present disclosure.

FIG. 12 is a sequence chart for a case in which beam pairing is performed in SL unicast communication according to an exemplary embodiment of the present disclosure.

Both a transmitting terminal 1201 and a receiving terminal 1202 of FIG. 12 may be terminals capable of performing SL unicast communication. In addition, both the transmitting terminal 1201 and the receiving terminal 1202 may include at least some of the components described in FIG. 2. In addition, the transmitting terminal 1201 and the receiving terminal 1202 may further include other components not illustrated in FIG. 2. For example, a display for user convenience and various sensors may be further included.

In the following description, overall operations performed by applying the first to third exemplary embodiments according to the present disclosure will be described with reference to FIG. 12.

Higher layer signaling may be performed between the transmitting terminal 1201 and the receiving terminal 1202 (1210). The higher layer signaling illustrated in FIG. 12 may be a step of providing various information required for SL unicast communication. The provided information may be various parameter information described above. For example, a higher layer signaling message may include the S-SSB period value for beam pairing, the transmission offset $T_{IBP\_TX\_offset}$ for indicating a delayed location of a terminal transmitting S-SSB(s) for beam pairing, the reception offset $T_{IBP\_RX\_offset}$ for reception of a response signal, and/or resource pool related information. A subject that transmits the higher layer signaling message may be the transmitting terminal 1201.

The transmitting terminal 1201 may configure S-SSB(s) based on the higher layer signaling transmitted in the step 1210 (1212). In this case, for the S-SSB(s), a resource may be allocated for each beam from the resource pool based on the first exemplary embodiment described above. In addition, the transmitting terminal 1201 may be configured to perform SSB transmission using the resources through beam sweeping. In this case, as described in the second exemplary embodiment, the transmitting terminal 1201 may set an initial beam pairing flag to 1 in a PSBCH payload to notify that the transmitted S-SSB(s) are per-beam S-SSB(s) for initial beam pairing. In addition, the transmitting terminal 1201 may transmit the S-SSB(s) for the respective beams through beam sweeping as described in the second exemplary embodiment. In addition, a transmission time of the first S-SSB for beam pairing transmitted from the transmitting terminal 1201 may be determined based on the transmission offset $T_{IBP\_TX\_offset}$ provided to the receiving terminal 1202 through higher layer signaling.

The transmitting terminal 1201 may transmit the S-SSB(s) at the time determined based on the transmission offset (1214a to 1214n). In other words, the transmitting terminal 1201 may transmit the S-SSB(s) as described in FIGS. 10A and/or 11A. In this case, n may be determined based on the number of S-SSBs that can be transmitted within the S-SSB period or the number of beams that can be transmitted within the S-SSB period. In addition, since the S-SSBs transmitted for beam pairing in the steps 1214a to 1214n may be transmitted through different beams, each S-SSB may include beam index information.

In the steps 1214a to 1214n, the receiving terminal 1202 may receive the S-SSBs transmitted by the transmitting terminal 1201. In addition, since each of the S-SSBs may include a PSBCH, the receiving terminal 1202 may identify whether it is an S-SSB for beam pairing through the initial beam pairing flag set by the transmitting terminal 1201.

The receiving terminal 1202 may receive the S-SSBs transmitted by the transmitting terminal 1201 and select an optimal beam or a preferred beam (1216). In this case, the optimal beam or the preferred beam may be determined based on received signal strengths or channel states of the received S-SSBs.

The receiving terminal 1202 may transmit a response signal (1218). Here, the response signal may implicitly or explicitly include beam identification (index) information, for example, a beam index for a preferred beam or optimal beam for beam pairing. In the step 1218, a time point or a method at or by which the receiving terminal 1202 transmits the response signal may be based on the method described in FIG. 10A or the method described in FIG. 10D in the third exemplary embodiment. Based on this, the receiving terminal 1202 may transmit the response signal. In the step 1218, as another example of the time point and method of transmitting the response signal by the receiving terminal 1202, the receiving terminal 1202 may transmit the response signal based on the method described in FIG. 11A or 11B of the second exemplary embodiment.

In addition, in the step 1218, one of the various methods described in the third exemplary embodiment of the present disclosure may be used as the method for the receiving terminal 1202 to transmit the response signal. For example, the method for the receiving terminal 1202 to transmit the response signal may use an S-SSB, PSFCH, CSI, or MAC CE. Since each of these methods has been described in the third exemplary embodiment, redundant description will be omitted.

In the step 1218, the transmitting terminal 1201 may receive the response signal. The transmitting terminal 1201 may identify the preferred beam or optimal beam of the receiving terminal 1202 based on the received response signal.

When transmitting data to the receiving terminal 1202, the transmitting terminal 1201 may transmit the data using the beam selected by the receiving terminal (1220). In addition, since data transmission and reception can be mutually performed in SL communication, the receiving terminal 1202 also may transmit data to the transmitting terminal 1201. In this case, since the transmitting terminal 1201 should operate as a receiving terminal, the beam pairing operation described in FIG. 12 between the receiving terminal 1202 and the transmitting terminal 1201 may be additionally performed with the receiving terminal 1202 as a subject.

Meanwhile, in the SL unicast communication defined in the current specifications, a PSSCH may be transmitted in a spatial multiplexing scheme based on up to two spatial layers to improve spectral efficiency. The receiving terminal may determine a rank indicator (RI) indicating a rank value of an SL channel based on a channel measurement result for an SL CSI-RS transmitted from up to two antenna ports of the transmitting terminal. The RI determines the number of data streams (identical to the number of spatial layers) that the channel can support. Since up to two streams can be supported in PSSCH transmission, the RI may be 1 or 2. The receiving terminal may determine a channel quality indicator (CQI) of the channel at the same time as determining the RI, and feedback channel state information (CSI) (a combination of CQI and RI) to the transmitting terminal for link/link adaptation of unicast PSSCH transmission.

In the NR Uu link, the terminal may feedback a precoding matrix indicator (PMI) in addition to CQI and RI, and accordingly, closed-loop multiple antenna transmissions are supported. However, the current SL specifications do not support PMI feedback. Therefore, in the NR SL, the transmitting terminal may perform open-loop multi-antenna SL transmissions based on CQI and RI fed back by the receiving terminal. The transmitting terminal may trigger the receiving terminal to perform CSI reporting on the unicast link by transmitting an SCI format 2-A including a CSI request set to land an SL CSI-RS. In addition, the receiving terminal may perform CSI reporting by feeding back the CSI to the transmitting terminal through a MAC CE carried on the PSSCH.

Exemplary Embodiment 4: Unicast Beam Management

In the fourth exemplary embodiment of the present disclosure, a beam management method in SL unicast will be described.

First, a transmitting terminal may periodically or aperiodically transmit CSI-RS or PSFCH for a beam management procedure as needed. The transmitting terminal may allocate CSI-RS/PSFCH to a different resource (frequency resource and/or time resource) for each beam, and transmit an SCI format 2 with a CSI request field set to 1.

Second, when the receiving terminal receives the SCI with the CSI request field set to 1, the following two cases may be classified according to a scheme of transmitting information on an optimal beam to the transmitting terminal.

A. (Using SCI or MAC CE)

The receiving terminal may measure a channel state for a per-beam resource region of the received CSI-RS or PSFCH. In addition, the receiving terminal may transmit SCI or a MAC CE to the transmitting terminal by including information on an index of an optimal beam or a CSI-RS/PSFCH resource region index corresponding to the optimal beam in the SCI or MAC CE based on the measured channel state. Through this, the receiving terminal may inform the transmitting terminal of the optimal beam index.

B. (Using PSFCH)

The receiving terminal may measure a channel state for a per-beam resource region of the received CSI-RS or PSFCH. In addition, the receiving terminal may transmit information on an index of an optimal beam or a CSI-RS/PSFCH resource region index corresponding to the optimal beam to the transmitting terminal on a PSFCH together with HARQ ACK/NACK information for a received TB.

In this case, a cyclic shift of the PSFCH or a frequency resource (PRBs or subchannel(s)) to which the PSFCH is allocated may be determined based on a combination of the HARQ ACK/NACK information and the optimal beam index (or CSI-RS/PSFCH resource region index corresponding to the optimal beam index). Therefore, the receiving terminal may inform the transmitting terminal of an index of a beam to be used by the transmitting terminal for the next unicast SL transmission together with the HARQ ACK/NACK information by differently configuring the cyclic shift of the PSFCH or the frequency resource to which the PSFCH is allocated.

Third, when the beam index fed back from the receiving terminal is different from the current beam index, the transmitting terminal may operate as follows for a case of receiving ACK through the PSFCH and a case of receiving NACK from the receiving terminal.

(1) When ACK is received from the receiving terminal through the PSFCH and the index of the beam fed back by the receiving terminal is different from the current beam index, the transmitting terminal may perform transmission of a new packet using the beam informed by the receiving terminal after $N_1$ slots ($N_1 \geq 0$). Here, $N_1$ may be a value (pre-)configured by a higher layer and may be a natural number.

(2) When NACK is received from the receiving terminal through the PSFCH and the index of the beam fed back by the receiving terminal is different from the current beam index, the transmitting terminal may perform retransmission of the corresponding packet by using the beam informed by the receiving terminal after $N_2$ slots ($N_2 \geq 0$). Here, $N_2$ may be a value that is (pre-)configured by a higher layer and may be a natural number.

Fourth, when unicast communication is interrupted, the transmitting terminal may operate a unicast beam management timer according to the present disclosure. In this case, the unicast beam management timer may be set to a preset time. If a unicast communication interruption time exceeds the time set in the timer, the transmitting terminal may perform a beam management procedure in preparation for the next unicast communication.

The beam management procedure in preparation for the next unicast communication may use one or a combination of two schemes below.

A. The transmitting terminal may re-perform the initial beam pairing procedure described in the second exemplary embodiment and the third exemplary embodiment of the present disclosure.

B. The transmitting terminal may re-perform the first and second operations in the fourth exemplary embodiment of the present disclosure.

Fifth, if a received power measured by the receiving terminal is less than a certain value, the receiving terminal may request the transmitting terminal to transmit CSI-RS or PSFCH for beam switching/update through the beam management procedure.

The overall operations of the fourth exemplary embodiment described above will be reviewed with reference to FIG. 13.

Figure 13:
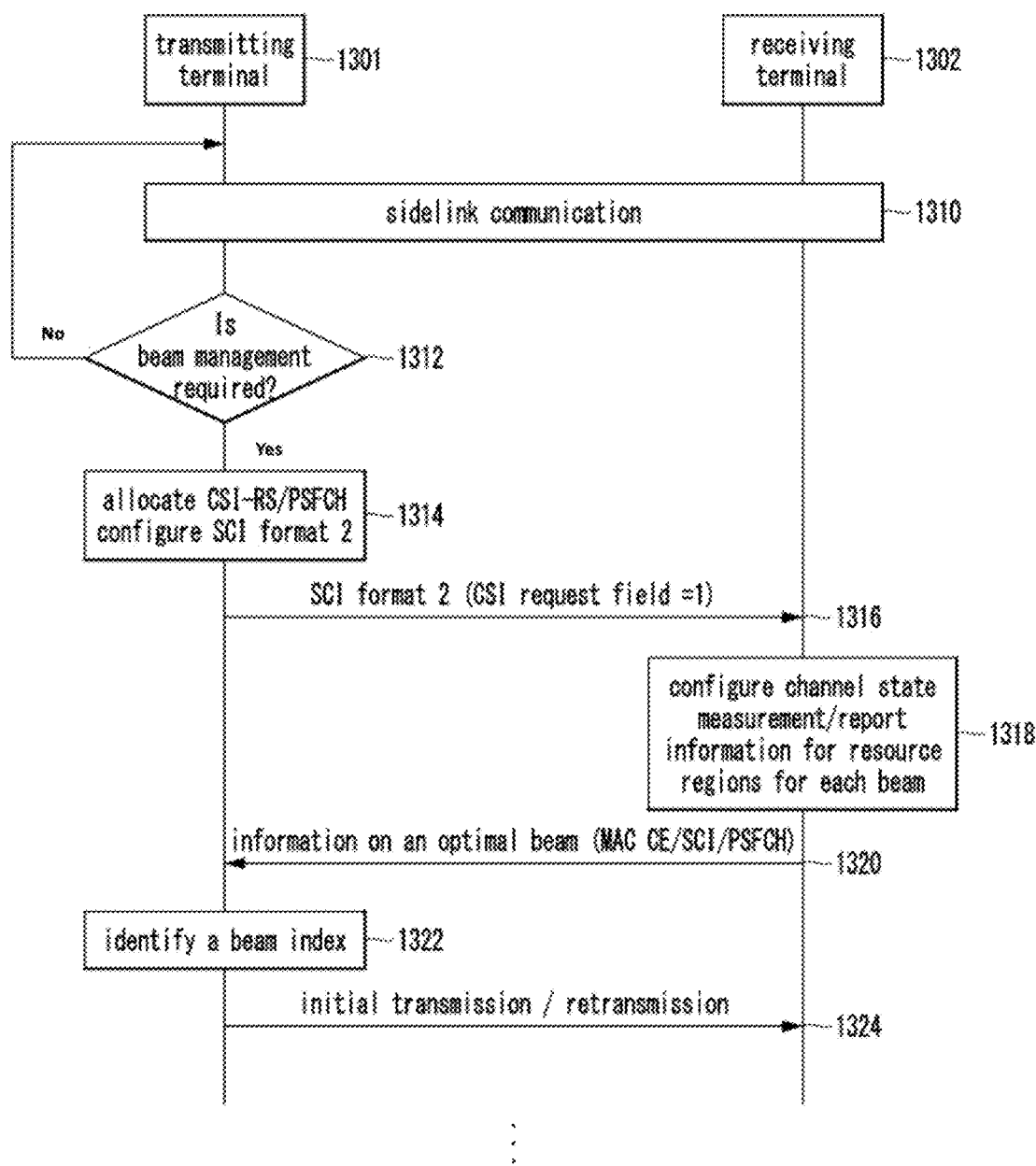
FIG. 13 is a sequence chart when performing unicast beam management according to the fourth exemplary embodiment of the present disclosure.

FIG. 13 is a sequence chart when performing unicast beam management according to the fourth exemplary embodiment of the present disclosure.

A transmitting terminal 1301 and a receiving terminal 1302 may perform SL communication (1310). In this case, the SL communication may be unicast communication.

The transmitting terminal 1301 may identify whether beam management is required (1312). The cases when beam management is required may include a case of periodic beam management, a case of aperiodic beam management, a case when the unicast beam management timer according to the present disclosure expires, which is set when the unicast communication is stopped, and the like.

When beam management is required, the transmitting terminal 1301 may allocate a CSI-RS/PSFCH to a different resource (frequency resource and/or time resource) for each beam (1314), and configure an SCI format 2 with a CSI request field set to 1.

The transmitting terminal 1301 may transmit the SCI format 2 with the CSI request field set to 1 to the receiving terminal 1302 (1316). Accordingly, the receiving terminal 1302 may receive the SCI format 2 with the CSI request field transmitted by the transmitting terminal 1302.

The receiving terminal 1302 may perform channel state measurement and configure report information based thereon (1318). The report information may use SCI, MAC CE, and/or PSFCH. In this case, the report information may include information explicitly or implicitly informing an optimal beam index.

The receiving terminal 1302 may transmit a report including the information on the optimal beam to the transmitting terminal 1301 (1320). In this case, the report may be used transmitted using SCI, MAC CE, and/or PSFCH as described above.

The transmitting terminal 1301 receiving the report including the information on the optimal beam may identify the beam index (1322). In other words, the transmitting terminal 1301 may identify the optimal beam index reported by the receiving terminal 1302.

The transmitting terminal 1301 may identify whether the optimal beam index has been changed by the receiving terminal 1302 (1322). In other words, the transmitting terminal 1301 may identify whether the beam index reported in the step S1320 is the same as or different from the beam index currently used for SL communication.

The transmitting terminal 1301 may perform initial transmission or retransmission. For example, when ACK was received from the receiving terminal 1302 on a PSFCH, and the index of the beam fed back by the receiving terminal 1302 is different from the current beam index, the transmitting terminal 1310 may perform initial transmission. In this case, an initial transmission beam may be transmitted based on the beam index reported by the receiving terminal 1302 in the step 1320, and may be transmitted from a slot after a time corresponding to a value preconfigured by a higher layer.

In another example, when NACK was received from the receiving terminal 1302 on a PSFCH, and the index of the beam fed back by the receiving terminal 1302 is different from the current beam index, the transmitting terminal 1301 may perform retransmission. In this case, a retransmission beam may be transmitted based on the beam index reported by the receiving terminal 1302 in the step 1320, and may be performed from a slot after a time corresponding to a value preconfigured by a higher layer.

Meanwhile, in an FR2 band considered in the 5G NR system, it is required to form a narrow beam to secure a required coverage for each V2X use case. In addition, it is required to support multiple beams in order to deliver signals in various directions in the groupcast or broadcast scheme.

Figure 14:
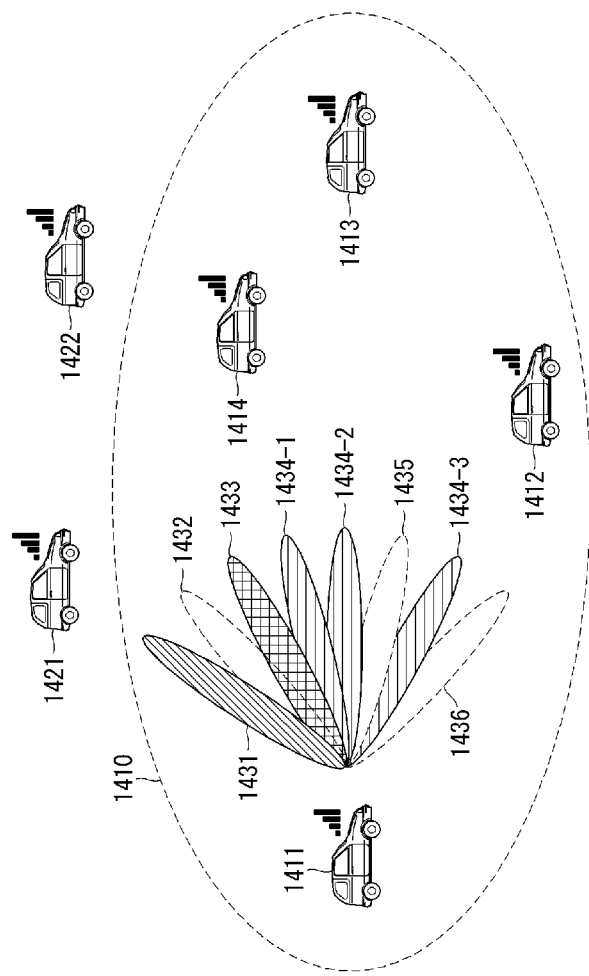
FIG. 14 is a conceptual diagram for describing multiple beams for delivering a signal to terminals located in various directions using a unicast, groupcast, or broadcast SL scheme.

FIG. 14 is a conceptual diagram for describing multiple beams for delivering a signal to terminals located in various directions using a unicast, groupcast, or broadcast SL scheme.

Referring to FIG. 14, a case in which a transmitting terminal 1411 can form a plurality of beams 1431, 1432, 1433, 1434-1, 1434-2, 1434-2, 1434-3, 1435, and 1436 is exemplified. In addition, only a communication region 1410 of the transmitting terminal 1411 is exemplified, but communication with terminals located outside the communication region 1410 may also be possible. As illustrated in FIG. 14, since the transmitting terminal 1411 is a moving object and the receiving terminals 1412, 1413, 1414, 1421, and 1422 are also moving objects, distances and signal transmission ranges between them may vary.

In FIG. 14, the transmitting terminal 1411 may perform unicast communication with the receiving terminal 1421 by using a first beam 1431. If the transmitting terminal 1411 cannot perform unicast communication with the receiving terminal 1421, the first beam 1431 may be used for broadcast communication.

In FIG. 14, the beams 1432, 1435, and 1436 indicated by dotted lines may exemplify beams that are not used for communication. In addition, the transmitting terminal 1411 may use the third beam 1433 as a broadcast beam. The transmitting terminal 1411 may use the fourth beams 1434-1, 1434-2, and 1434-3 as multicast beams. The multicast beams may be used to perform multicast communication with the receiving terminals 1412, 1413, and 1414.

FIG. 14 illustrates one example for describing a case in which one transmitting terminal can form a plurality of beams, and each beam can be used in various manners, and it is not intended to limit the present disclosure.

When the transmitting terminal 1411 can form a plurality of beams, if the transmitting terminal 1411 should perform sensing for all the beams by alternating all the beams, there may occur a problem in which a sensing accuracy of each beam is degraded. Therefore, in the present disclosure, a method for beam sensing is proposed.

Exemplary Embodiment 5: Beam-Based Sensing

In the fifth exemplary embodiment of the present disclosure, a beam-based sensing method for SL unicast will be described.

First, a transmitting terminal may perform sensing sequentially for all available beams or a predetermined beam set (including $N_{beam1}$ beams). Here, $N_{beam1}$ may be a value (pre-)configured by a higher layer.

Second, when the transmitting terminal receives a resource selection trigger in a slot n, the transmitting terminal may perform sensing on $N_{beam2}$ ($N_{beam2} \leq N_{beam1}$) beams during a window (a time period corresponding to slots belonging to [n+$T_3$, n+$T_3$+M])) comprising M slots after the slot n. Here, each of the factors $T_3$, M, and $N_{beam2}$, which define the window comprising M slots, may be a value (pre-)configured by a higher layer.

For example, the transmitting terminal may perform sensing on 5 beams ($N_{beam1}$=5) before receiving a resource selection trigger, receive a resource selection trigger, and perform sensing only on 2 ($N_{beam2}$=2) beams during 10 (M=10) slots after a slot $T_1$.

Third, the sensing beams may be allocated according to a preference of the transmitting terminal.

The transmitting terminal may set the number of sensing operations on beams with high preference to be large. Accordingly, sensing accuracy for high preference beams may be improved, and sensing on high preference beams may be performed with high probability at a time point close to the resource triggering time point n.

A beam sensing order not considering beam preference may be exemplified as shown below.

Beam 0→Beam 1→Beam 2→Beam 3

Considering the beam preference, a beam sensing order may be determined as examples below. For example, assuming that the beam preference has an order of (beam 1>beam 2>beam 0=beam 3), the beam sensing order may be determined as shown below.

Beam 0→Beam 1→Beam 1→Beam 1→Beam 2→Beam 2→Beam 3            Example 1

Beam 0→Beam 1→Beam 2→Beam 1→Beam 2→Beam 1→Beam 3            Example 2

Example 1 and Example 2 above are only examples to help understanding of the beam sensing order determination method, and various beam sensing orders may be determined using the methods exemplified above.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a transmitting terminal, comprising:
setting an initial beam pairing flag indicating that the transmitting terminal transmitting sidelink-synchronization signal blocks (S-SSBs) is not a synchronization reference terminal;
transmitting a plurality of S-SSBs including the initial beam pairing flag in a beam sweeping scheme;
receiving, from a receiving terminal, information on a preferred beam among a plurality of beams through which the plurality of S-SSBs are transmitted; and
transmitting data to the receiving terminal using the preferred beam, wherein the initial beam pairing flag is included in a physical sidelink broadcast channel (PSBCH) of each of the plurality of S-SSBs, and 1 bit among reserved bits included in a payload of the PSBCH is used to indicate the initial beam pairing flag.

2. The method according to claim 1, further comprising:
dividing available beams of the transmitting terminal into a plurality of beam groups; and
selecting one group from among the plurality of groups, wherein the plurality of beams used for transmission of the plurality of S-SSBs are included in the one group.

3. The method according to claim 1, wherein the plurality of S-SSBs are transmitted within a transmission period, and the transmission period and a number of the plurality of S-SSBs transmitted within the transmission period are configured by higher-layer signaling of the transmitting terminal.

4. The method according to claim 1, wherein the information on the preferred beam is included in a response S-SSB transmitted by the receiving terminal, and the response S-SSB includes the initial beam pairing flag.

5. The method according to claim 4, wherein the response S-SSB is received in a transmission resource associated with a transmission resource of a first S-SSB having the preferred beam among the plurality of S-SSBs.

6. The method according to claim 1, wherein the information on the preferred beam is received on an earliest physical sidelink feedback channel (PSFCH) after a feedback offset from a transmission time of a last S-SSB among the plurality of S-SSBs.

7. The method according to claim 1, further comprising:
transmitting, to the receiving terminal, configuration information of a channel state information-reference signal (CSI-RS) for each of the plurality of beams; and
transmitting, to the receiving terminal, sidelink control information (SCI) including information requesting a CSI report.

8. A method of a receiving terminal, comprising:
receiving, from a transmitting terminal, a plurality of sidelink synchronization signal blocks (S-SSBs);
identifying an initial beam pairing flag included in each of the plurality of S-SSBs;
selecting one S-SSB from among the plurality of S-SSBs;
determining a beam corresponding to the one S-SSB as a preferred beam; and
transmitting, to the transmitting terminal, information on the preferred beam,
wherein the initial beam pairing flag indicates that the transmitting terminal transmitting the plurality of S-SSBs is not a synchronization reference terminal,
wherein the initial beam pairing flag is included in a physical sidelink broadcast channel (PSBCH) of each of the plurality of S-SSBs, and 1 bit among reserved bits included in a payload of the PSBCH is used to indicate the initial beam pairing flag.

9. The method according to claim 8, wherein the plurality of S-SSBs are transmitted within a transmission period, and the transmission period and a number of the plurality of S-SSBs transmitted within the transmission period are configured by higher-layer signaling of the transmitting terminal.

10. The method according to claim 8, wherein the information on the preferred beam is included in a response S-SSB transmitted by the receiving terminal, and the response S-SSB includes the initial beam pairing flag.

11. The method according to claim 10, wherein the response S-SSB is transmitted in a transmission resource associated with a transmission resource of a first S-SSB having the preferred beam among the plurality of S-SSBs.

12. The method according to claim 8, wherein the information on the preferred beam is transmitted on an earliest physical sidelink feedback channel (PSFCH) after a feedback offset from a reception time of a last S-SSB among the plurality of S-SSBs.

13. A transmitting terminal comprising a processor, wherein the processor causes the transmitting terminal to perform:
setting an initial beam pairing flag indicating that the transmitting terminal transmitting sidelink-synchronization signal blocks (S-SSBs) is not a synchronization reference terminal;
transmitting a plurality of S-SSBs including the initial beam pairing flag in a beam sweeping scheme;
receiving, from a receiving terminal, information on a preferred beam among a plurality of beams through which the plurality of S-SSBs are transmitted; and
transmitting data to the receiving terminal using the preferred beam,
wherein the initial beam pairing flag is included in a physical sidelink broadcast channel (PSBCH) of each of the plurality of S-SSBs, and 1 bit among reserved bits included in a payload of the PSBCH is used to indicate the initial beam pairing flag.

14. The transmitting terminal according to claim 13, wherein the processor further causes the transmitting terminal to perform:
- dividing available beams of the transmitting terminal into a plurality of beam groups; and
- selecting one group from among the plurality of groups, wherein the plurality of beams used for transmission of the plurality of S-SSBs are included in the one group.

15. The transmitting terminal according to claim 13, wherein the plurality of S-SSBs are transmitted within a transmission period, and the transmission period and a number of the plurality of S-SSBs transmitted within the transmission period are configured by higher-layer signaling of the transmitting terminal.

16. The transmitting terminal according to claim 13, wherein the information on the preferred beam is included in a response S-SSB transmitted by the receiving terminal, the response S-SSB includes the initial beam pairing flag, and the response S-SSB is received in a transmission resource associated with a transmission resource of a first S-SSB having the preferred beam among the plurality of S-SSBs.

17. The transmitting terminal according to claim 13, wherein the information on the preferred beam is received on an earliest physical sidelink feedback channel (PSFCH) after a feedback offset from a transmission time of a last S-SSB among the plurality of S-SSBs.

* * * * *